(12) United States Patent
Muller

(10) Patent No.: US 11,570,705 B2
(45) Date of Patent: Jan. 31, 2023

(54) METHOD OF SECURING WIRELESS BACKHAUL, A CHILD BASE STATION, A PARENT BASE STATION AND METHODS IN THE CHILD AND PARENT BASE STATIONS

(71) Applicant: FUJITSU LIMITED, Kawasaki (JP)

(72) Inventor: Julien Muller, Stockholm (SE)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 17/140,083

(22) Filed: Jan. 3, 2021

(65) Prior Publication Data

US 2021/0136676 A1    May 6, 2021

Related U.S. Application Data

(63) Continuation of application No. PCT/EP2019/058301, filed on Apr. 2, 2019.

(30) Foreign Application Priority Data

Aug. 3, 2018 (EP) ........................................ 8187394

(51) Int. Cl.
*H04W 48/18* (2009.01)
*H04B 7/26* (2006.01)
(Continued)

(52) U.S. Cl.
CPC .......... *H04W 48/18* (2013.01); *H04B 7/2606* (2013.01); *H04W 24/02* (2013.01); *H04W 84/047* (2013.01); *H04W 92/20* (2013.01)

(58) Field of Classification Search
CPC ... H04W 84/047; H04W 40/22; H04W 40/24; H04W 40/244; H04W 40/246;
(Continued)

(56) References Cited

U.S. PATENT DOCUMENTS

| 5,479,400 A | 12/1995 | Dilworth et al. |
| 2006/0166694 A1 | 7/2006 | Jeong et al. |

(Continued)

FOREIGN PATENT DOCUMENTS

| EP | 3 209 051 A1 | 8/2017 |
| WO | 2011/113467 A1 | 9/2011 |

(Continued)

OTHER PUBLICATIONS

Extended European search report with the Partial European search report / declaration of no search and the European search opinion issued by the European Patent Office for corresponding European Patent Application No. 20190591.6-1212, dated Mar. 12, 2021.

(Continued)

*Primary Examiner* — Huy C Ho
(74) *Attorney, Agent, or Firm* — Myers Wolin, LLC

(57) ABSTRACT

A method of securing wireless backhaul for a child base station in a first network provided by a first operator, including: any parent base station with wireline backhaul capability and configured to virtualise a core network User Plane Function, UPF, advertises that it supports a wireless backhaul service; the child base station in the first network connects over an air interface to one or more parent base stations in a second network provided by a second operator; the child base station sends a backhaul service request to a connected parent base station; when the backhaul service request is accepted, the connected parent base station uses a virtualised UPF to enable a direct wireline backhaul link between the parent base station and a data network; and the child base station uses the air interface as a wireless backhaul link and the wireline backhaul link of the connected parent base station for backhaul.

15 Claims, 15 Drawing Sheets

(51) Int. Cl.
 *H04W 24/02* (2009.01)
 *H04W 84/04* (2009.01)
 *H04W 92/20* (2009.01)

(58) Field of Classification Search
 CPC ... H04W 40/248; H04W 40/28; H04W 40/26; H04W 40/30; H04W 40/32; H04W 40/38; H04W 40/34; H04W 48/04; H04W 48/06; H04W 48/02; H04W 48/00; H04W 48/08; H04W 48/10; H04W 48/12; H04W 48/14; H04W 48/16; H04W 48/17; H04W 48/18; H04W 48/20; H04W 76/16; H04W 76/15; H04W 88/06; H04W 88/08; H04W 88/10; H04W 88/12; H04W 88/14; H04W 88/16; H04W 88/18; H04W 88/181; H04W 88/182; H04W 88/184; H04W 92/00; H04W 92/02; H04W 92/04; H04W 92/045; H04W 92/08; H04W 92/10; H04W 92/12; H04W 92/14; H04W 92/20; H04W 92/16; H04W 92/22; H04W 92/24; H04W 24/02; H04B 7/15542; H04B 7/15507; H04B 7/1555; H04B 7/2606
 USPC .......................................................... 370/329
 See application file for complete search history.

(56) References Cited

U.S. PATENT DOCUMENTS

| | | | |
|---|---|---|---|
| 2012/0002594 | A1 | 1/2012 | Rácz et al. |
| 2016/0007227 | A1 | 1/2016 | Picker |
| 2017/0290049 | A1 | 10/2017 | Reisslein et al. |
| 2018/0020368 | A1* | 1/2018 | Tapia .................... H04W 24/02 |
| 2019/0319774 | A1* | 10/2019 | Luo .................... H04W 72/0453 |

FOREIGN PATENT DOCUMENTS

| | | |
|---|---|---|
| WO | 2013/043577 A2 | 3/2013 |
| WO | 2016/059960 A1 | 4/2016 |
| WO | 2017/133261 A1 | 8/2017 |
| WO | 2017/133262 A1 | 8/2017 |
| WO | 2018/072905 A1 | 4/2018 |

OTHER PUBLICATIONS

3GPP TR 38.913 V14.3.0, "3rd Generation Partnership Project; Technical Specification Group Radio Access Network; Study on Scenarios and Requirements for Next Generation Access Technologies; (Release 14)", Jun. 2017.

3GPP TS 22.261 V15.4.0, "3rd Generation Partnership Project; Technical Specification Group Services and System Aspects; Service requirements for the 5G system; Stage 1 (Release 15)", Mar. 2018.

AT&T et al., "New SID Proposal: Study on Integrated Access and Backhaul for NR", Agenda Item: 9.1, 3GPP TSG-RAN Meeting #75, RP-170821, Dubrovnik, Croatia, Mar. 6-9, 2017.

3GPP TS 23.251 V14.1.0, "3rd Generation Partnership Project; Technical Specification Group Services and System Aspects; Network Sharing; Architecture and functional description (Release 14)", Sep. 2017.

3GPP TS 38.201 V15.0.0, "3rd Generation Partnership Project; Technical Specification Group Radio Access Network; NR; Physical layer; General description (Release 15)", Dec. 2017.

Extended European search report with supplementary European search report and the European search opinion issued by the European Patent Office for corresponding European Patent Application No. 18187394.4, dated Nov. 21, 2018.

3GPP TR 38.874 V0.3.2, "3rd Generation Partnership Project; Technical Specification Group Radio Access Network; Study on Integrated Access and Backhaul; (Release 15)", Jun. 2018, Chapters 5 and 6.

International Search Report and Written Opinion of the International Searching Authority issued by the European Patent Office for corresponding International Patent Application No. PCT/EP2019/058301, dated May 16, 2019.

3GPP TS 23.501 V15.2.0, "3rd Generation Partnership Project; Technical Specification Group Services and System Aspects; System Architecture for the 5G System; Stage 2 (Release 15)" Jun. 2018.

ETSI GS NFV 001, "Network Functions Virtualisation (NFV); Use Cases", Oct. 2013.

Notice of Reasons for Refusal issued by the Japan Patent Office for corresponding Japanese Patent Application No. 2020-572744, dated Mar. 15, 2022, with an English translation.

* cited by examiner

METHOD OF SECURING WIRELESS BACKHAUL, A CHILD BASE STATION, A PARENT BASE STATION AND METHODS IN THE CHILD AND PARENT BASE STATIONS

CROSS-REFERENCE TO RELATED APPLICATION

This application is a continuation application of International Application PCT/EP2019/058301 filed on Apr. 2, 2019 and designated the U.S., which claims foreign priority to EP 18187394.4 filed on Aug. 3, 2018, the entire contents of each are incorporated herein by reference.

FIELD

This disclosure relates generally to wireless communication methods and systems in which wireless backhaul is used. A wireless backhaul link provides an interconnection for user plan packets between network nodes using radio access technology. The disclosure further relates to a parent base station which provides a wired backhaul connection, and a child base station which connects wirelessly to the parent base station to use the wired backhaul connection.

Particularly, but not exclusively, the disclosure relates to an optimised wireless backhaul sharing method in a "5G" (also known as "NR" for New Radio) wireless communication environment with a multi-operator dense deployment.

BACKGROUND

Wireless communication systems are widely known in which terminals (also called user equipments or UEs, subscriber or mobile stations) communicate over a wireless interface (also referred to as an air interface) with base stations (BSs) within communication range of the terminals. Communication of user plane packets between the base stations and the core network is referred to as backhaul, and is usually over wired links.

At a given carrier frequency the different geographical areas served by one or more base stations are generally referred to as cells. A base station may control one or more transmission (and/or reception) points and each transmission point may support one or more cells. Typically many transmission points are provided in appropriate locations so as to form a network covering a wide geographical area more or less seamlessly with adjacent and/or overlapping cells. (In this specification, the terms "system" and "network" are used synonymously). For each cell, a base station, which provides or at least manages the transmission point, divides the available bandwidth, i.e. frequency and time resources, into individual resource allocations for the user equipments served by the cell. In this way, a signal transmitted in a cell and scheduled by the base station has a specific location in the frequency and time domains. The terminals are generally mobile and therefore may move among the cells, prompting a need for handover of the connection of the terminal to the network as the terminal moves between adjacent cells. A terminal may be in range of (i.e. able to detect signals from and/or communicate with) several cells at the same time, but in the simplest case it communicates with one "serving" cell. A terminal is normally only able to access a single network provided by a single operator. However networks/operators may cooperate.

4G and 5G Architecture

One type of cellular wireless network is based upon the set of standards referred to as Long-Term Evolution (LTE) or 4G. In this network topology, each terminal, called a UE in LTE, connects wirelessly over an air interface (labelled Uu) to a base station in the form of an enhanced node-B or eNB. It should be noted that various types of eNB are possible. An eNB may support one or more cells at different carrier frequencies, each cell having differing transmit powers and different antenna configurations, and therefore providing coverage areas (cells) of differing sizes. Multiple eNBs deployed in a given geographical area constitute a wireless network called the E-UTRAN.

Each eNB in turn is connected by a (usually) wired link (labelled S1) to higher-level or "Core Network" (CN) entities, including a Serving Gateway (labelled S-GW), and a Mobility Management Entity (labelled MME) for managing the system and sending control signalling to other nodes, particularly eNBs, in the network. In addition, a Packet Data Network (PDN) Gateway (P-GW) is present, separately or combined with the S-GW, to exchange data packets with any packet data network including the Internet. Thus, communication is possible between the LTE network and other networks. Meanwhile, the eNBs may communicate among themselves via a wired or wireless X2 interface.

Nowadays mobile access to the Internet or other communications networks is becoming a crucial necessity for both business and personal life and there are significant challenges to the current wireless systems due to the popularity of new applications such as social networking, cloud based services and big data analysis. With the forthcoming services such as Internet of things and ultra-reliable, mission-critical connections, a next-generation radio access system to succeed LTE/LTE-A and known as "5G" or "NR" (New Radio) is needed to satisfy all those demanding requirements. Studies regarding 5G/NR are proceeding within various groups within 3GPP, the 3rd Generation Partnership Project previously responsible for devising the UMTS and LTE standards.

As part of the physical layer design, the traditional concept of a base station which both schedules resources and houses the physical antennas for wireless communication with terminals, becomes more fluid. Terminology used with respect to 5G/NR includes "gNB" (Next generation Node B), which manages (either locally or remotely) at least one transmission point. Such a transmission point may also serve as a reception point, and is typically referred to as a TRP or TRxP (Transmission/Reception Point).

In the 4G core network (CN), called the Evolved Packet Core (EPC), protocol and reference points (interfaces) are defined for each entity such as the Mobility Management Entity (MME), Serving Gateway (S-GW), and Packet Data Network Gateway (P-GW) as described above.

On the other hand, in the 5G core, protocol and reference points (interfaces) are defined for each Network Function (NF). An NF may be implemented either as a network element on a dedicated hardware, as a software instance running on a dedicated hardware, or as a virtualised function (not limited to specific hardware) instantiated on an appropriate platform, e.g., a cloud infrastructure.

FIG. 1 is a diagram of architecture and reference points (NG1-NG15) for 5G. It shows that User Equipment (UE) at the bottom left of the diagram is connected to either Radio Access Network (RAN) or Access Network (AN) as well as Access and Mobility Function (AMF). RAN represents a base station using new RAT (a gNB) and evolved LTE while AN is a general base station including non-3GPP access, e.g., Wi-Fi. The UPF is connected to the data network (e.g. operator services, Internet access or 3rd party services), the AN or RAN and the SMF. The SMF is responsible for the enforcement of the policy decisions related to service data flow detection, authorized QoS (Quality of Service), charging, gating, traffic usage reporting, packet routing and forwarding and traffic steering. The SMF controls the policy and charging enforcement which includes the binding of service data flows to QoS Flows as well as the interaction with the CHF. The SMF interacts with the UPF(s), the RAN and the UE to achieve the appropriate treatment of the user plane traffic.

The 5G core network consists of various NFs. In FIG. 1, there are seven 5G core NFs, namely, (1) AMF, (2) Session Management Function (SMF), (3) Policy Control Function (PCF), (4) Application Function (AF), (5) Authentication Server Function (AUSF), (6) User Plane Function (UPF), and (7) User Data Management (UDM).

As part of the 5G network architecture (5GC) a key concept is the separation of control and user planes. The user plane carries user traffic while the control plane carries signalling in the network. The UPF is in the user plane and all other NFs, i.e., AMF, SMF, PCF, AF, AUSF, and UDM, are in the control plane. Separating the user and control planes guarantees each plane resource may be scaled independently. It also allows UPFs to be deployed separately from control plane functions in a distributed fashion. In this architecture, UPFs may be deployed very close to UEs to shorten the Round Trip Time (RTT) between UEs and the data network for some applications requiring low latency.

The relevant interfaces/reference points in the user plane are as follows. The interface between UPFs and the Data Network (DN) is the N6 interface as shown in FIG. 1. The interface between UPFS themselves is the NG 9 interface. The interface between gNBs is referred to as the Xn interface (corresponding to the X2 interface in 4G, and not shown in FIG. 1). The interface between the gNB and the UPF is referred to as the NG interface (also not shown in FIG. 1). The interface between a gNB and a UE is referred to as a Uu air interface (also not shown).

A UPF may be viewed as a collection of User Plane functionalities that may, for example, be different from operator A to operator B. The UPF is generally located at a different physical location from the base station. UPF is a Core Network entity, which serves many thousand base stations. Therefore it is beneficial to centralize it.

3GPP TS 23.501 "System Architecture for the 5G System", which is hereby incorporated by reference has the following description of the UPF in section 6.2.3:

"UPF

The User plane function (UPF) includes the following functionality. Some or all of the UPF functionalities may be supported in a single instance of a UPF:

Anchor point for Intra-/Inter-RAT mobility (when applicable).
External PDU Session point of interconnect to Data Network.
Packet routing & forwarding (e.g. support of Uplink classifier to route traffic flows to an instance of a data network, support of Branching point to support multi-homed PDU Session).
Packet inspection (e.g. Application detection based on service data flow template and the optional PFDs received from the SMF in addition).
User Plane part of policy rule enforcement, e.g. Gating, Redirection, Traffic steering).
Lawful intercept (UP collection).
Traffic usage reporting.
QoS handling for user plane, e.g. UL/DL rate enforcement, Reflective QoS marking in DL.
Uplink Traffic verification (SDF to QoS Flow mapping).
Transport level packet marking in the uplink and downlink.
Downlink packet buffering and downlink data notification triggering.
Sending and forwarding of one or more "end marker" to the source NG-RAN node.
ARP proxying as specified in IETF RFC 1027 [53] and/or IPv6 Neighbour Solicitation Proxying as specified in IETF RFC 4861 [54] functionality for the Ethernet PDUs. The UPF responds to the ARP and/or the IPv6 Neighbour Solicitation Request by providing the MAC address corresponding to the IP address sent in the request.
NOTE: Not all of the UPF functionalities are required to be supported in an instance of user plane function of a Network Slice."

Different operators will need different UPFs and as described above UPFs may be deployed very close to UEs to shorten the Round Trip Time (RTT) between UEs and data network for some applications requiring low latency. Also, multiple UPFs may serve the same device.

5G Small Cells Deployment in Millimetre Wave Spectrum

Small cells in the mmW band (with a wavelength from ten to one millimetre) are a key deployment scenario for 5G. Relevant 5G requirements are defined in 3GPP TR 38.913: "Study on Scenarios and Requirements for Next Generation Access Technologies" which is hereby incorporated by reference. Sections 6.1.1 Indoor hotspot, 6.12 Dense urban, 7.1 Peak data rate, 7.5 User plane latency, 7.7 Mobility interruption time, 7.9 Reliability, 7.17 Connection density, 10.8 Easy operation and Self Organization requirements, and 7.14 Area traffic capacity are particularly relevant and relevant parts are summarised below:

The indoor hotspot deployment scenario focuses on small coverage per site/TRxP (transmission and reception point) and high user throughput or user density in buildings. The key characteristics of this deployment scenario are high capacity, high user density and consistent user experience indoor. The carrier frequency is around 30 GHz or Around 70 GHz or Around 4 GHz. The ISD is 20 m (Equivalent to 12TRxPs per 120 m×50 m)

The dense urban microcellular deployment scenario focuses on macro TRxPs with or without micro TRxPs and high user densities and traffic loads in city centres and dense urban areas. The key characteristics of this deployment scenario are high traffic loads, outdoor and outdoor-to-indoor coverage. This scenario will be interference-limited, using macro TRxPs with or without micro TRxPs. A continuous cellular layout and the associated interference shall be assumed. The carrier frequency is around 4 GHz+Around 30 GHz (two layers). The ISD has Macro layer: 200 m, Micro layer: 3 micro TRxPs per macro TRxP. All micro TRxPs are all outdoor.

The target for peak data rate should be 20 Gbps for downlink and 10 Gbps for uplink. Mobility interruption time means the shortest time duration supported by the system during which a user terminal cannot exchange user plane packets with any base station during transitions. The target for mobility interruption time should be 0 ms. For eMBB, the target for user plane latency should be 4 ms for UL, and 4 ms for DL.

Reliability may be evaluated by the success probability of transmitting X bytes within a certain delay, which is the time it takes to deliver a small data packet from the radio protocol layer 2/3 SDU ingress point to the radio protocol layer 2/3

SDU egress point of the radio interface, at a certain channel quality (e.g., coverage-edge). A general URLLC reliability requirement for one transmission of a packet is $1-10^{-5}$ for 32 bytes with a user plane latency of 1 ms.

The target for connection density should be 1 000 000 device/km² in urban environment.

For Easy operation and Self Organization requirements, the RAN design for the Next Generation Radio Access Technologies shall be designed to fulfill the following requirements:

RAN shall support the deployment of RAN SON functions in a hybrid manner (distributed and centralized. Collaboration and coordination among RAN SON functions need to be addressed.

User/application level QoS and QoE (Quality of Experience) monitoring capability by UEs and network elements shall be supported.

Area traffic capacity means total traffic throughput served per geographic area (in Mbit/s/m²). In order to improve area traffic capacity, 3GPP may develop standards with means for high spectrum efficiency. To this end, spectrum efficiency gains in the order of three times IMT-Advanced are targeted. Furthermore, 3GPP may develop standards with means for large bandwidth support. To this end, it is proposed that at least 1 GHz aggregated bandwidth shall be supported.

Therefore it may be seen that a dense network (e.g. small cells) with a reliable and optimised backhaul path is needed. The indoor hotspot scenario only uses small cells (20 m ISD), which may be deployed in mmW band (around 30 GHz or around 70 GHz). The dense urban scenario uses small cells (3 per macro cell), which may be deployed in mmW band (around 30 GHz). The required peak data rate needs a very large bandwidth, available in the mmW spectrum. The required user plane latency needs an optimised backhaul path. The mobility interruption time and reliability requirements need a reliable backhaul path.

The requirement for area traffic capacity needs a dense network (i.e. deployment of small cells) and a very large bandwidth, available in the mmW spectrum. The connection density requirement needs a dense network (i.e. deployment of small cells). The easy operation and self-organization requirement shows the importance of node cooperation.

Self-Backhauling in 5G

As 5G will increase the number of RAN nodes which need to be connected to the CN, backhaul will become an even more strategic asset. Furthermore the very high-speed and reliability requested for 5G need to be supported by the transport technology. Fibre optic would be the best medium for this backhaul link. But due to its cost, installation impact and regulation, it is not possible to deploy it everywhere. Therefore wireless backhaul will be the best alternative.

Today wireless backhaul is widely used but has constraints which limit usage in 5G. Because spectrum is rare and expensive, the operators are not using the same carrier for their wireless service and for any wireless backhaul link connecting the base station to the CN. Operators use different licensed spectrum or even unlicensed spectrum, with their own limitation (e.g. power limitation, limited bandwidth, etc.). Furthermore using different carriers requires new equipment, including its own antenna and power connection. This is not compatible with the small cell footprint.

However, thanks to new technologies such as beamforming and mmW, operators will be able to reuse high-quality licensed spectrum in an efficient way. New antennas with beam management and several antenna elements will be able to direct a beam to a very precise point in space (e.g. another gNB). In that case, reusing the same spectrum will have a limited impact on interference. On the same aspect, as attenuation in mmW band increases quite quickly with distance, and this will help to reduce the interference if the same spectrum is used several times. The large bandwidth available in this band will help the backhaul link to reach the high capacity needed for 5G.

Therefore ideas such as self-backhauling may realistically be deployed. A self-backhauling node is a node which may use its dedicated spectrum in order to wirelessly connect to another node with access to the Core Network. The 3GPP definition and requirements are defined in 3GPP TS 22.261: "Service requirements for next generation new services and markets" as follows:

6.12.1 Description

The increased density of access nodes needed to meet future performance objectives poses considerable challenges in deployment and management (e.g., backhaul availability, backhaul capacity and scalability). The use of wireless backhaul for such access nodes helps to address some of the challenges.

Wireless self-backhauling in the radio access network can enable simpler deployment and incremental rollout by reducing reliance on the availability of wired backhaul at each access node location. Network planning and installation efforts can be reduced by leveraging plug and play type features—self-configuration, self-organizing, and self-optimisation.

6.12.2 Requirements

The 5G network shall enable operators to support wireless self-backhaul using NR and E-UTRA.

The 5G network shall support flexible and efficient wireless self-backhaul for both indoor and outdoor scenarios.

The 5G network shall support flexible partitioning of radio resources between access and backhaul functions.

The 5G network shall support autonomous configuration of access and wireless self-backhaul functions.

The 5G network shall support multi-hop wireless self-backhauling.

NOTE 1: This is to enable flexible extension of range and coverage area.

The 5G network shall support autonomous adaptation on wireless self-backhaul network topologies to minimize service disruptions.

The 5G network shall support topologically redundant connectivity on the wireless self-backhaul.

NOTE 2: This is to enhance reliability and capacity and reduce latency.

One way of providing wireless backhaul would be to use relaying principles (single or multi-hops). An example of this deployment may be seen in FIG. 2. This figure is taken from a 3GPP Study RP-170821 Item Description "Study on Integrated Access and Backhaul for NR" which proves that this topic is important for mobile operators. It shows integrated access and backhaul links. Each TRP provides access to UEs, but TRP A provides relay backhaul over an air interface for TRP B and TRP C, so that these two act as relay nodes. The operation of the different links may be on the same or different frequencies (also termed 'in-band' and 'out-band' relays).

Traditional RAN Sharing

Another way of different operators sharing network equipment, which has not been previously used for self-backhaul, is to share resources is to share the RAN itself. Several solutions are described in 3GPP TS 23.251: "Network sharing; Architecture and functional description". FIGS. 3 and 4 show the 2 different methods standardized by 3GPP in the 4G context.

In a GWCN (Gateway Core Network) configuration shown in FIG. 3, the eNBs, the spectrum and the MMEs are shared between operators. In the MOCN (Multi-Operator Core Network) configuration shown in FIG. 4, the eNBs and the spectrum are shared between operators. Non standardized methods also exist, such as MORAN (Multiple Operators Radio Access Network), where only the base stations (and not the spectrum) are shared, but will not be detailed here.

However all these RAN sharing features impacting the core network design. Furthermore user plane packets need to be routed through the core network which limits the possibility of local breakout to offload the backhaul link. Also, the eNB functions are shared, which means that services and configuration need to be discussed among the operators. The participating operators are not able to manage their own eNB functions and their own eNB configuration.

Core Network and RAN virtualisation in NFV (Network Function Virtualisation)

Virtualisation of network functions has been studied by an important number of standardization body and research projects. NFV de-couples networking components from (proprietary) hardware appliances, for example by running functionality which may be instantiated at various locations, for instance in software. The ETSI ISG NFV standardization group for example defines several use cases for RAN and core network virtualisation in ETSI GS NFV 001 v1.1.1 (see use cases #5 and #6, which are incorporated by reference).

The functions provided by the core network and the RAN may be virtualised and deployed on a common hardware infrastructure. FIGS. 5 and 6 are high level representation of these architectures in 4G networks corresponding to use cases #5 and #6. In FIG. 5, the EPC and other network functions are virtualised in data centres on the cloud, which provides functions of the P/SGW, MME and HSS (Home Subscriber Server). FIG. 6 shows Virtualisation of the RAN-C-RAN architecture using a centralized BBU pool.

Problem

Self-backhauling as defined previously may be seen as a solution to the backhaul deployment issue for small cells. However this solution has some limitations and needs optimisation, for example to allow for the requirements in 3GPP TS 22.261: "Service requirements for next generation new services and markets".

The 5G network shall support autonomous configuration of access and wireless self-backhaul functions.

The 5G network shall support multi-hop wireless self-backhauling.

NOTE 1: This is to enable flexible extension of range and coverage area.

The 5G network shall support autonomous adaptation on wireless self-backhaul network topologies to minimize service disruptions.

The 5G network shall support topologically redundant connectivity on the wireless self-backhaul.

NOTE 2: This is to enhance reliability and capacity and reduce latency.

Some of the limitations are also due to the physical properties of the mmW band:

Severe short-term blocking means that the self-backhaul link quality may change very quickly Propagation characteristics means a lower distance between two connected nodes. Therefore wireless backhaul signal may need several hops to find a node with wireline connectivity to the CN Therefore it is desirable to provide fast and autonomous RAN-based mechanisms for wireless backhaul.

According to an embodiment of a first aspect of the invention, there is provided a method of securing wireless backhaul for a child base station (for example with limited or no wireline backhaul) in a first network provided by a first operator, wherein: any parent base station with wireline backhaul capability and configured to virtualise a core network User Plane Function, UPF, advertises that it supports a wireless backhaul service; the child base station in the first network connects over an air interface to one or more parent base stations in a second network provided by a second operator; the child base station sends a backhaul service request to a connected parent base station; when the backhaul service request is accepted, the connected parent base station uses a virtualised UPF to enable a direct wireline backhaul link between the parent base station and a data network; and the child base station uses the air interface as a wireless backhaul link and the wireline backhaul link of the connected parent base station for backhaul.

This embodiment allows a child base station (which may be a base station with limited or no wireline backhaul) to use the wireline access of another base station from a different operator. The virtualisation of the UPF secures an optimised path for the backhaul directly from the parent base station to the data network without routing through any additional hardware entities provided by either operator. The embodiment is applicable to any telecommunications system which may virtualise CN user plane functionality.

The air interface may use any suitable spectrum and timing. In one example, the air interface uses resources allocated to the connected parent base station for Radio Access Network, RAN, communication with User Equipments, UEs. This is not the same as self-backhauling in that the child base station uses the resources provided by the parent base station for wireless backhaul (rather than its own resources)

In order to fully optimise the backhaul path, the connected parent base station may virtualise core network UPFs of the first network and of the second network to provide the wireless backhaul service. These UPFs may be any that are defined in the two networks. These may be selected on a per-operator basis from the list of functionalities described in TS 23.501:

Anchor point for Intra-/Inter-RAT mobility (when applicable).

External PDU Session point of interconnect to Data Network.

Packet routing & forwarding (e.g. support of Uplink classifier to route traffic flows to an instance of a data network, support of Branching point to support multi-homed PDU Session).

Packet inspection (e.g. Application detection based on service data flow template and the optional PFDs received from the SMF in addition).

User Plane part of policy rule enforcement, e.g. Gating, Redirection, Traffic steering).

Lawful intercept (UP collection).

Traffic usage reporting.

QoS handling for user plane, e.g. UL/DL rate enforcement, Reflective QoS marking in DL.

Uplink Traffic verification (SDF to QoS Flow mapping).

Transport level packet marking in the uplink and downlink.

Downlink packet buffering and downlink data notification triggering.

Sending and forwarding of one or more "end marker" to the source NG-RAN node.

ARP proxying as specified in IETF RFC 1027 [53] and/or IPv6 Neighbour Solicitation Proxying as specified in IETF RFC 4861 [54] functionality for the Ethernet PDUs. The UPF responds to the ARP and/or the IPv6 Neighbour Solicitation Request by providing the MAC address corresponding to the IP address sent in the request.

In many circumstances the backhaul path passes directly from the child base station to the parent base station in a single link and then from the parent base station to the data network in a single link. However, in other circumstances, an intermediate base station may act as a wireless backhaul relay between the child base station and the parent base station. The intermediate base station may be from the first network, or from the second network, or from a further network. It uses its own air interface to receive the signalling and backhaul and forwards the signalling and backhaul to the second network using the air interface of the parent base station. More than one intermediate base station may be provided.

In one scenario, the child base station connects to more than one parent base station in the second network and selects one for backhaul use; and when the radio conditions between the child base station and the connected parent base station being used for backhaul drop below a quality threshold, the child base station uses a different connected parent base station in the second network for backhaul. This allows a fast change to a new backhaul connection when required (for example to cope with network changes).

In this context, the base stations may share information about their backhaul sharing (and virtualisation capabilities) with their neighbours (either their immediate neighbours or also more distant neighbours if the information is relayed). From this information received a connected parent base station (preferably the connected parent base station being used for backhaul) may send to the child base station a list of the wireless backhaul service capabilities of neighbouring base stations in the second network. The child base station may build a routing table from the list for backhaul connectivity. Such a routing table may be used to quickly identify which base station to connect to next.

The neighbouring base stations may be defined in any suitable way, for example by simple adjacency (immediate neighbours), by a physical distance from the parent base station or by a distance in terms of a maximum number of links (i.e. more than one link) between base stations from the parent base station.

In one embodiment, any base station sends a wireless backhaul capability message to adjacent base stations of the same network via an interface between base stations, the message including a maximum hops count limiting the number of times that the wireless backhaul capability message is then relayed along links between base stations.

This maximum hops count may be used to limit the spread of the information. When a base station receives a wireless backhaul capability message with a maximum hops count above zero, the receiving base station may decrement the maximum hops count and relay the wireless backhaul capability message to adjacent base stations. When the count is zero, the message is not forwarded. In either case, when a base station receives the wireless backhaul capability message it passes the wireless backhaul capability message to any child base station to which it is connected (or to any child base station for which it is providing backhaul).

Implementation of the invention is not limited to two networks/operators. The child base station may connect over a third network air interface to one or more parent base stations in a third network provided by a third operator. In this case the third network may behave in the same way as the second network. For example, the routing table may also have entries for the base stations in the third network. Clearly, similar functionality may be provided for a fourth and fifth network etc.

When the radio conditions between the child base station and the connected parent base station being used for backhaul drop below a quality threshold, and when there is no other connected parent base station in the second network, the child base station may connect to another parent base station in the second network. If there is also a third network, the child base station may connect to another parent base station in the third network (or in the fourth or fifth network etc.).

The child base station may have a maximum number (Max Uu) of additional air interface links to connected parent base stations and wherein when one connected parent base station changes its wireless backhaul capability from available to unavailable, the child base station may deactivate its air interface link to that parent base station and increase the maximum number by one (to allow for a new connection).

Equally, when one parent base station changes its wireless backhaul capability from unavailable to available, the child base station may activate its air interface link to that parent base station (but only if the maximum Uu number is greater than zero) and decrease the maximum additional air interfaces Uu number by one.

According to an embodiment of a second aspect of the invention, there is provided a child base station (perhaps with limited or no wireline backhaul) in a first network provided by a first operator, the child base station comprising: a controller and a transmission and reception unit, the controller to control the transmission and reception unit to: connect over an air interface to one or more parent base stations in a second network provided by a second operator, the one or more parent base stations having wireline backhaul capability and configured to virtualise a core network User Plane Function, UPF to allow a direct wireline backhaul link to a data network; to send a backhaul service request to a connected parent base station; and when the backhaul service request is accepted, to use the air interface as a wireless backhaul link to the wireline backhaul link of the connected parent base station.

According to an embodiment of a third aspect of the invention, there is provided a parent base station with wireline backhaul capability and configured to virtualise a core network User Plane Function, UPF, the parent base station being in a second network provided by a second operator and comprising: a controller, a transmission and reception unit and a connection to a data network; wherein: the controller controls the transmission and reception unit to: advertise that the parent base station supports a wireless backhaul service; allow connection over an air interface of a child base station (potentially with limited or no wireline backhaul), the child base station being in a first network provided by a first operator; receive and accept a backhaul service request from the connected child base station; and the controller virtualises a UPF to enable a wireline backhaul link between the parent base station and a data network, enabling the child base station to use the air interface as a wireless backhaul link and the wireline backhaul link of the connected parent base station for backhaul.

The child and parent base station also have normal base station functionality in terms of supporting UE communication.

According to an embodiment of a fourth aspect of the invention, there is provided a method in a child base station in a first network provided by a first operator, wherein the child base station: connects over an air interface to one or more parent base stations in a second network provided by a second operator, the one or more parent base stations having wireline backhaul capability and configured to virtualise a core network User Plane Function, UPF to allow a direct wireline backhaul link to a data network; sends a backhaul service request to a connected parent base station; and when the backhaul service request is accepted, uses the air interface as a wireless backhaul link to the wireline backhaul link of the connected parent base station.

According to an embodiment of a fifth aspect of the invention, there is provided a method in a parent base station with wireline backhaul capability and configured to virtualise a core network User Plane Function, UPF, the parent base station being in a second network provided by a second operator and the method comprising: advertising that the parent base station supports a wireless backhaul service; allowing connection over an air interface of a child base station, the child base station being in a first network provided by a first operator; receiving and accepting a backhaul service request from the connected child base station; and virtualising a UPF to enable a direct wireline backhaul link between the parent base station and a data network, enabling the child base station to use the air interface as a wireless backhaul link and the wireline backhaul link of the connected parent base station for backhaul.

A base station or computer program according to embodiments herein may comprise any combination of the method aspects. Methods or computer programs according to further embodiments may be described as computer-implemented in that they require processing and memory capability.

The apparatus according to preferred embodiments is described as configured or arranged to, or simply "to" carry out certain functions. This configuration or arrangement could be by use of hardware or middleware or any other suitable system. In preferred embodiments, the configuration or arrangement is by software.

Thus according to one aspect there is provided software in the form of computer-readable instructions which, when executed by a processor (controller) in a base station, causes the base station to function as the child or parent base station referred to in any of the preceding definitions.

According to a further aspect there is provided a program which when loaded onto the controllers of the base stations of the first and second network configures the base stations to carry out the method steps according to any of the preceding method definitions or any combination thereof.

The invention is described in terms of particular embodiments. Other embodiments are within the scope of the following claims. For example, the steps of the invention may be performed in a different order and still achieve desirable results.

Preferred features of several embodiments will now be described, purely by way of example, with references to the accompanying drawings, in which.

A dense network of small cells operating on millimetre wave band will be a key deployment scenario in 5G. However deployment cost and site availability are important challenges operators need to cope with. Therefore resource sharing among operators will be key for fast deployment in dense areas. Traditional RAN sharing will be one way of sharing the cost, but it will limit operators to shared nodes with shared performances, services, etc. Therefore another possibility envisaged by the inventor would be to share a backhaul link.

With technologies such as beam forming, self-backhaul small cells with wireless backhaul will become realistic. However propagation rules mean low distance of separation between nodes in the mmW band, therefore wireless backhaul signal will need several hops to find a node with wireline connectivity to the CN. Additionally, because of severe short term blocking in the mmW band, there is a need for fast RAN-based mechanisms for switching between TRPs. Embodiments of the invention aim at reducing the latency in backhaul for user plane data (by shortening and optimising the path of the shared wireless backhaul) and securing the network path for this. They may also reduce the latency of initiating wireless backhaul.

Invention embodiments provide methods which virtualise (and operate and signal about) UPF functions from another operator in a gNB, in order to shorten and optimise the path of the shared wireless backhaul. All the functionalities of an UPF may be virtualised and deployed on a BS. However not all of them are necessary for the invention embodiments. The virtualised UPF functions are the limited set of CN functions from the UPFs used for backhaul in any specific case and are dependent on the operator's configuration and vendor's implementation.

Figure 7:
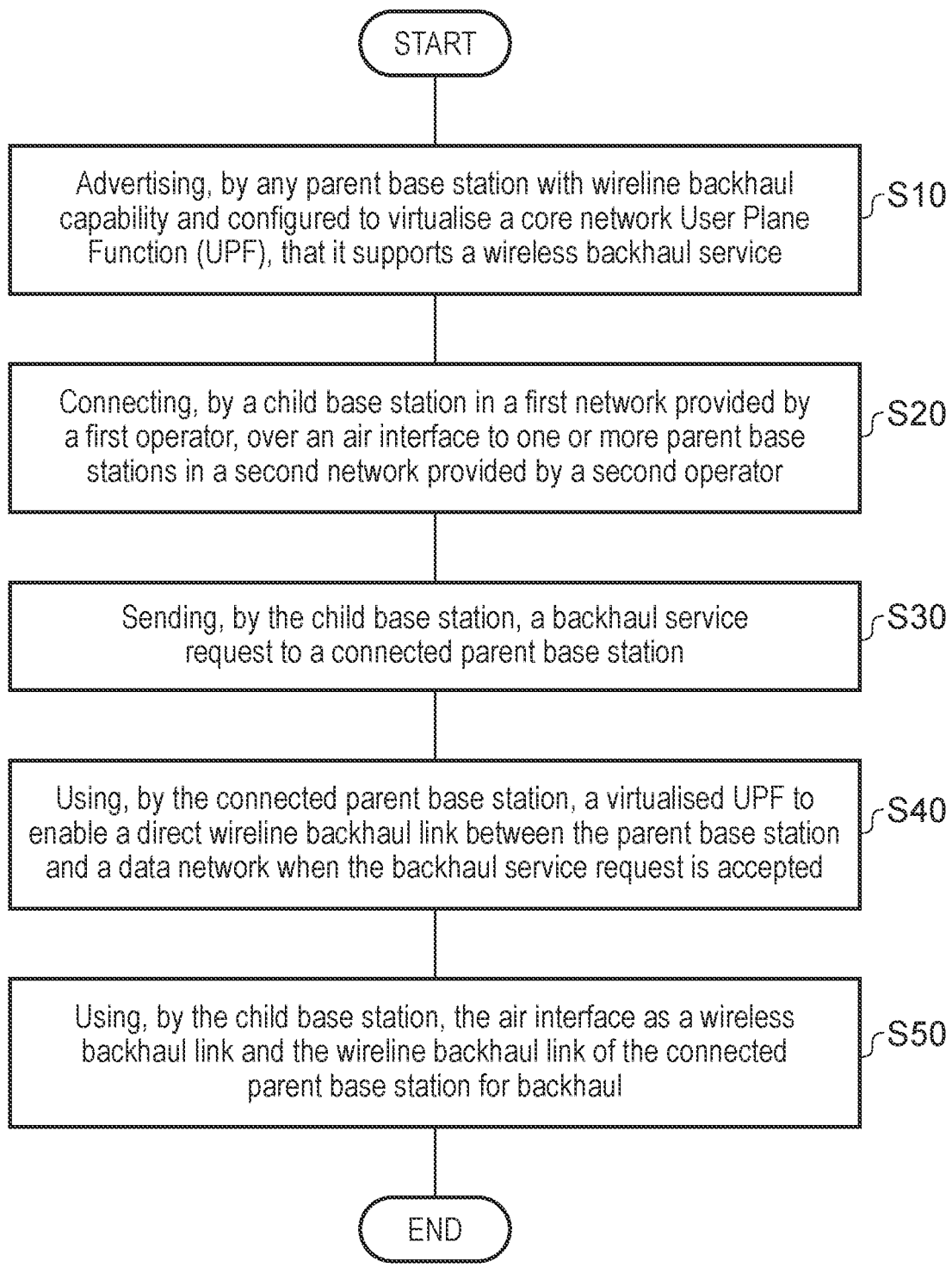
FIG. 7 is a flowchart of an invention embodiment provided in two operator networks.

FIG. 7 is a flow chart of a method of securing wireless backhaul for a base station in a first network provided by a first operator. The method spans two networks with different operators. The base station is referred to as a child base station because it uses another base station (the parent base station) to provide it with backhaul capability. The method uses a wireline backhaul capability of another base station (referred to as a parent base station because of its use in providing backhaul to another base station (to the child base station). The child base station also uses the air interface of the parent base station.

In step S10 any parent base station with wireline backhaul capability and configured to virtualise a core network User Plane Function, UPF, advertises that it supports a wireless backhaul service. In step S20, the child base station in the first network connects over an air interface to one or more parent base stations in a second network provided by a second operator. The air interface is provided by the parent base station(s) and in this sense the child base station acts like a UE.

In step S30, the child base station sends a backhaul service request to a connected parent base station. The particular base station chosen may be dictated by radio conditions. In step S40, if the backhaul service request is accepted, the connected parent base station uses a virtualised UPF (for example the required UPFs of both networks in this instance) to enable a direct wireline backhaul link between the parent base station and a data network. Finally, in step S50, the child base station uses the air interface as a wireless backhaul link and the wireline backhaul link of the connected parent base station for backhaul.

Figure 8:
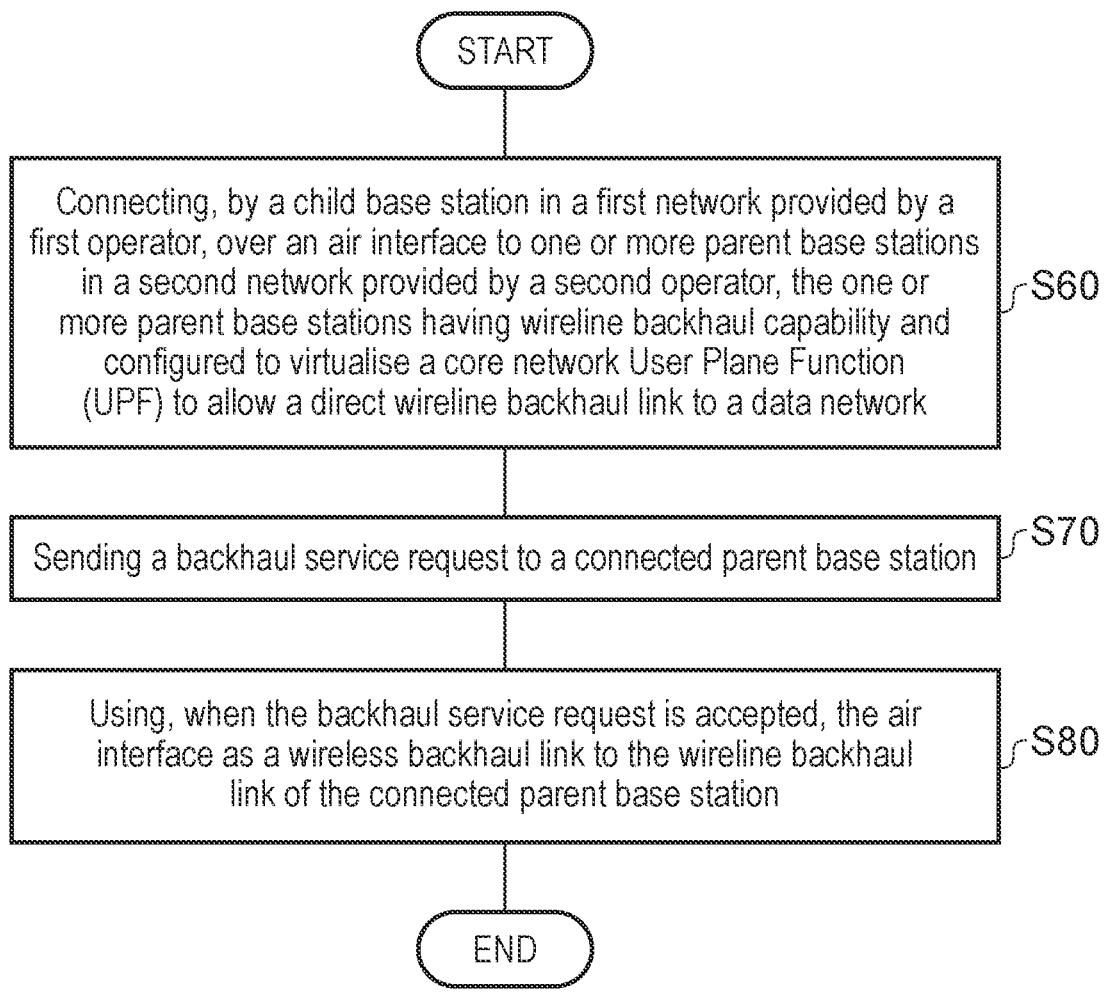
FIG. 8 is a flowchart of an invention embodiment provided in a child base station.

FIG. 8 is a flowchart of an invention embodiment provided in a child base station and thus in a single network with a single operator (owner). The child base station has limited or no wireline backhaul, or has wireline backhaul available but is not using the wireline backhaul for some reason and is in a first network provided by a first operator. In step S60, the child base station connects over an air interface to one or more parent base stations in a second network provided by a second operator. The one or more parent base stations have wireline backhaul capability and are configured to virtualise a core network User Plane Function, UPF to allow a direct wireline backhaul link to a data network. In step S70, the child base station sends a backhaul service request to a connected parent base station; and in step S80 (if the backhaul service request is accepted), the child base station uses the air interface as a wireless backhaul link to the wireline backhaul link of the connected parent base station.

Figure 9:
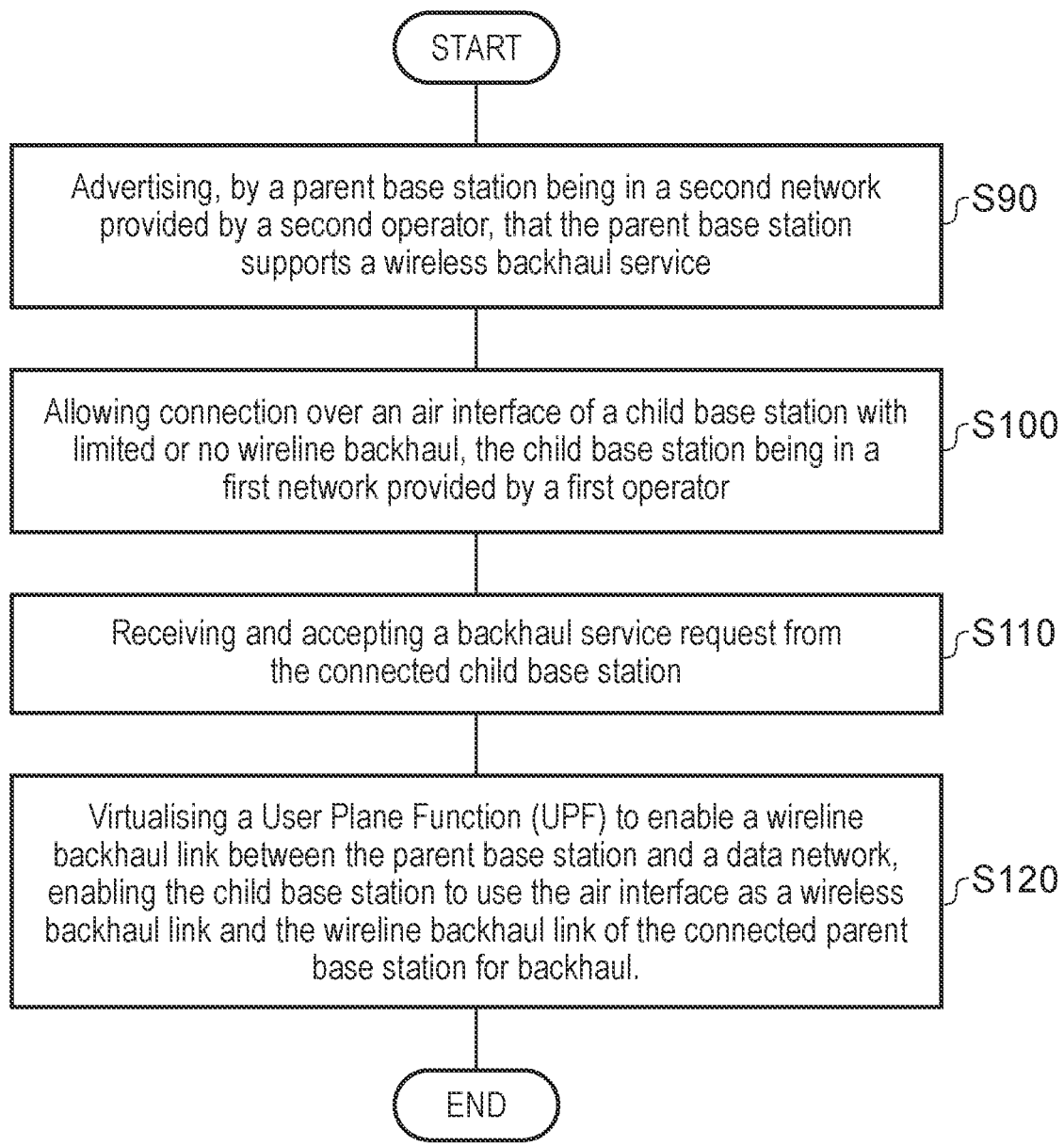
FIG. 9 is a flowchart of an invention embodiment provided in a parent base station.

FIG. 9 is a flowchart of an invention embodiment provided in a parent base station. The parent base station has wireline backhaul capability, is configured to virtualise a core network User Plane Function, UPF, and is in a second network provided by a second operator. In step S90 the parent base station advertises that it supports a wireless backhaul service. In step S100, the parent base station allows connection over an air interface of a child base station (with limited or no wireline backhaul), the child base station being in a first network provided by a first operator. In step S110, the parent base station receives and accepts a backhaul service request from the connected child base station. In step S120 (providing the request is accepted by the second operator) the parent base station virtualises a UPF to enable a wireline backhaul link between the parent base station and a data network, enabling the child base station to use the air interface as a wireless backhaul link and the wireline backhaul link of the connected parent base station for backhaul.

Figure 10:
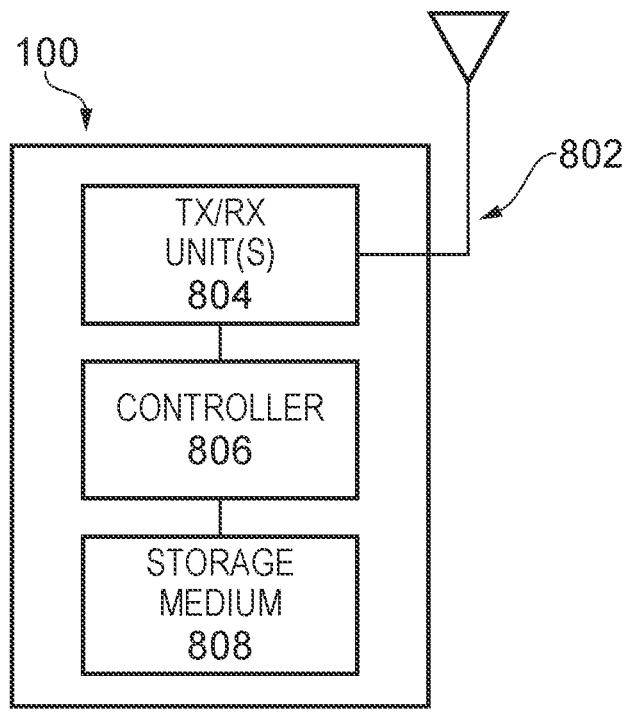
FIG. 10 is an overview diagram of a child base station.
Figure 11:
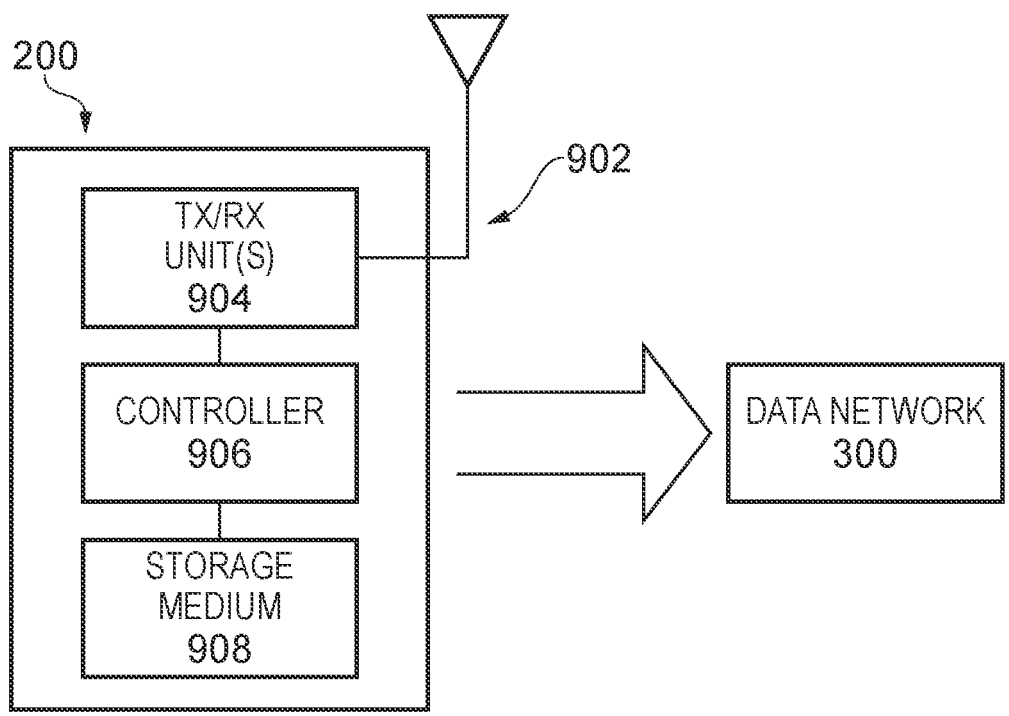
FIG. 11 is an overview diagram of a parent base station.

FIG. 10 is a block diagram illustrating an example of equipment suitable for use as a child base station (100). The equipment includes a TRP and thus transmitter/receiver unit(s) 804 connected to at least one antenna 802 (together defining a communication unit, which may be a TRP) and a controller 806. The controller may be, for example, a microprocessor, DSP, ASIC, FPGA, or other logic circuitry programmed or otherwise configured to perform the various functions described above, in particular the steps in the flowchart of FIG. 8. For example, the various functions of the child base station described above may be embodied in the form of a computer program stored in the storage medium 808 and executed by the controller 806. The transmission/reception unit 804 is responsible for transmission and reception over the wireless interface of the second operator network to the parent base station under control of the controller 906. The child base station may use a different transmitter/receiver for communication with UEs.

Figure 1:
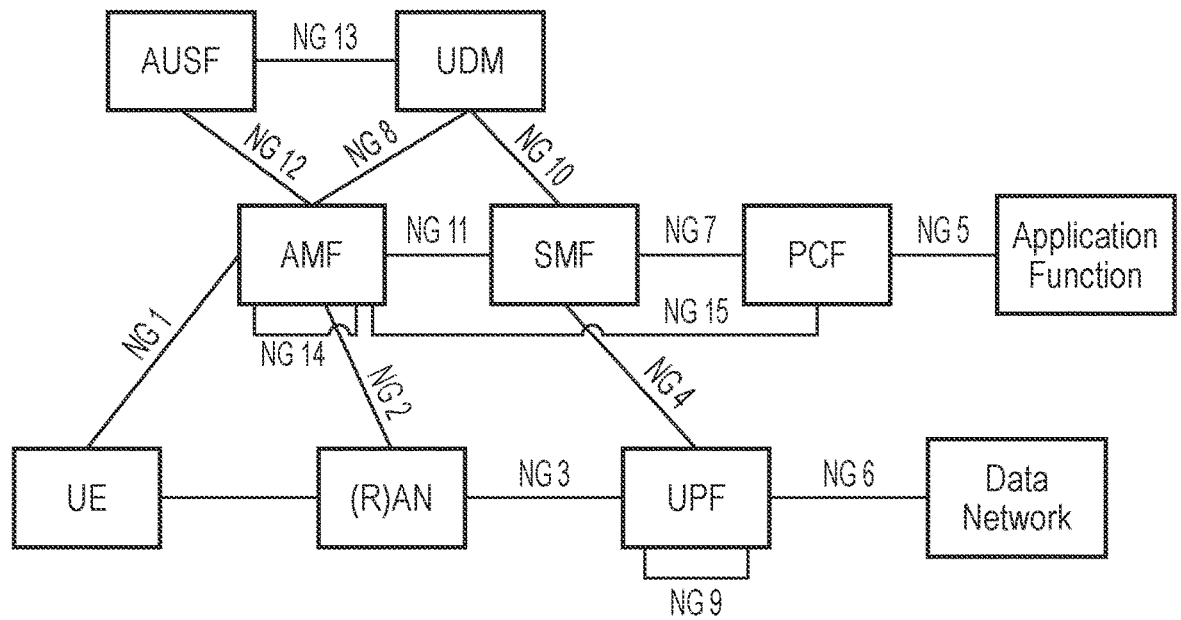
FIG. 1 (already described) is a structural diagram of architecture and reference points for 5G.
Figure 2:
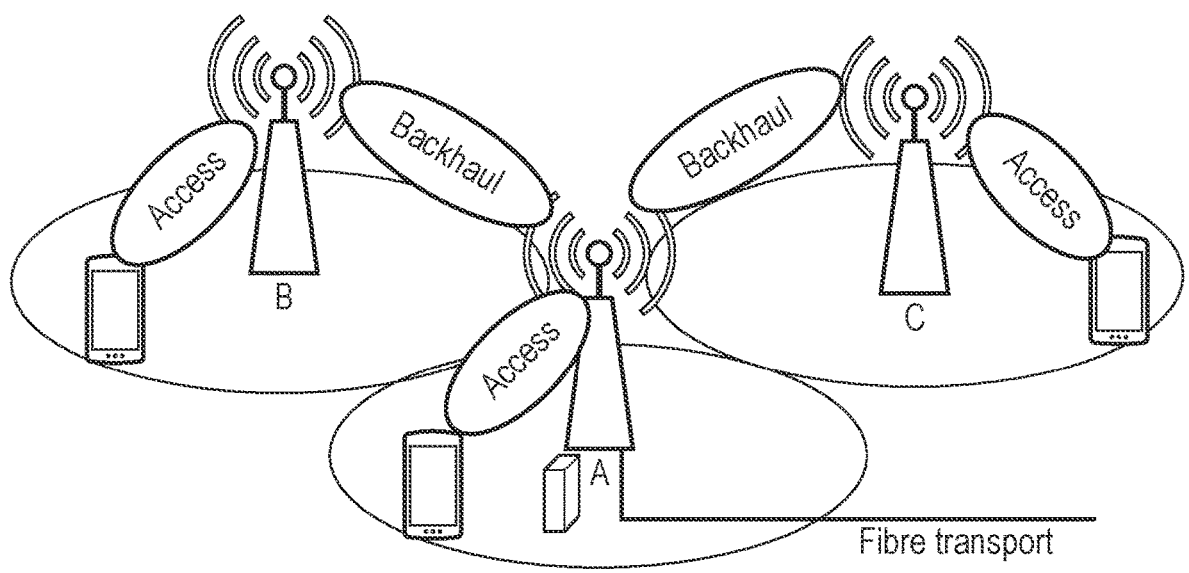
FIG. 2 (already described) is a conceptual diagram showing integrated access and backhaul links.
Figure 3:
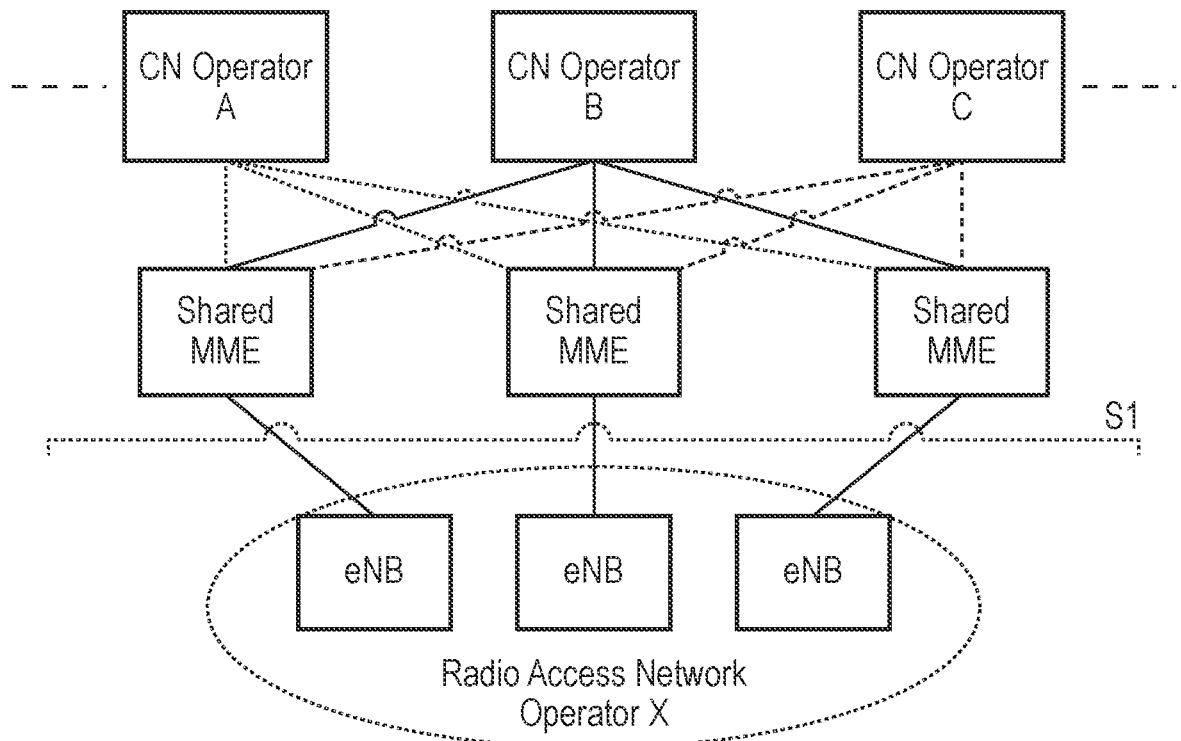
FIG. 3 (already described) is a structural diagram of RAN sharing using a GWCN (Gateway Core Network) configuration.
Figure 4:
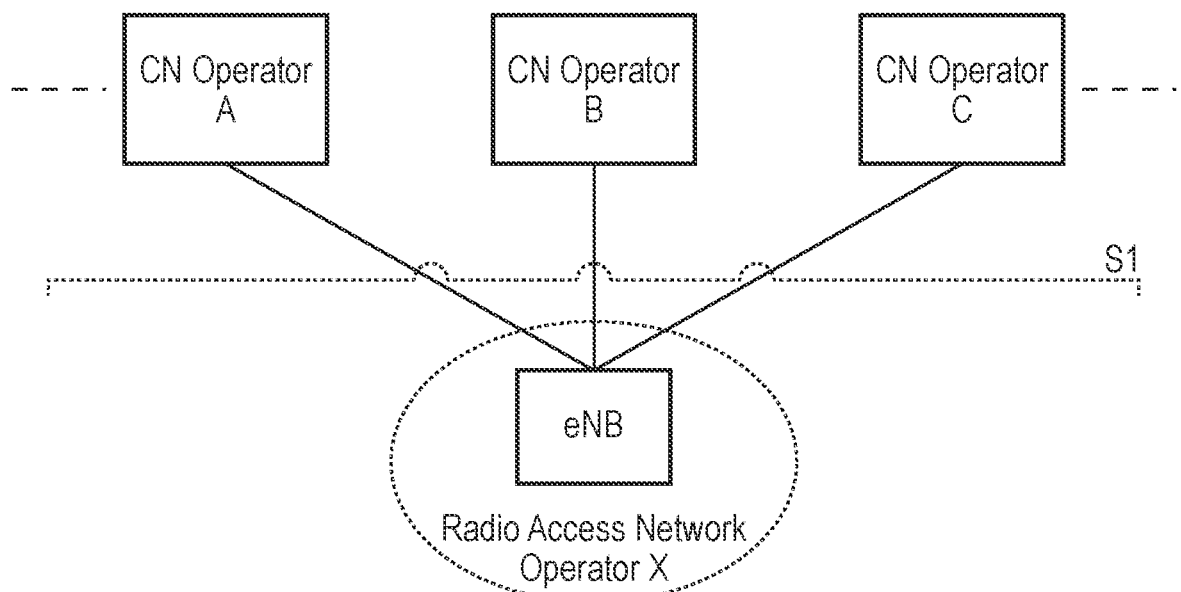
FIG. 4 (already described) is a structural diagram of RAN sharing using a MOCN (Multi-Operator Core Network) configuration in which multiple CN nodes are connected to the same eNB.
Figure 5:
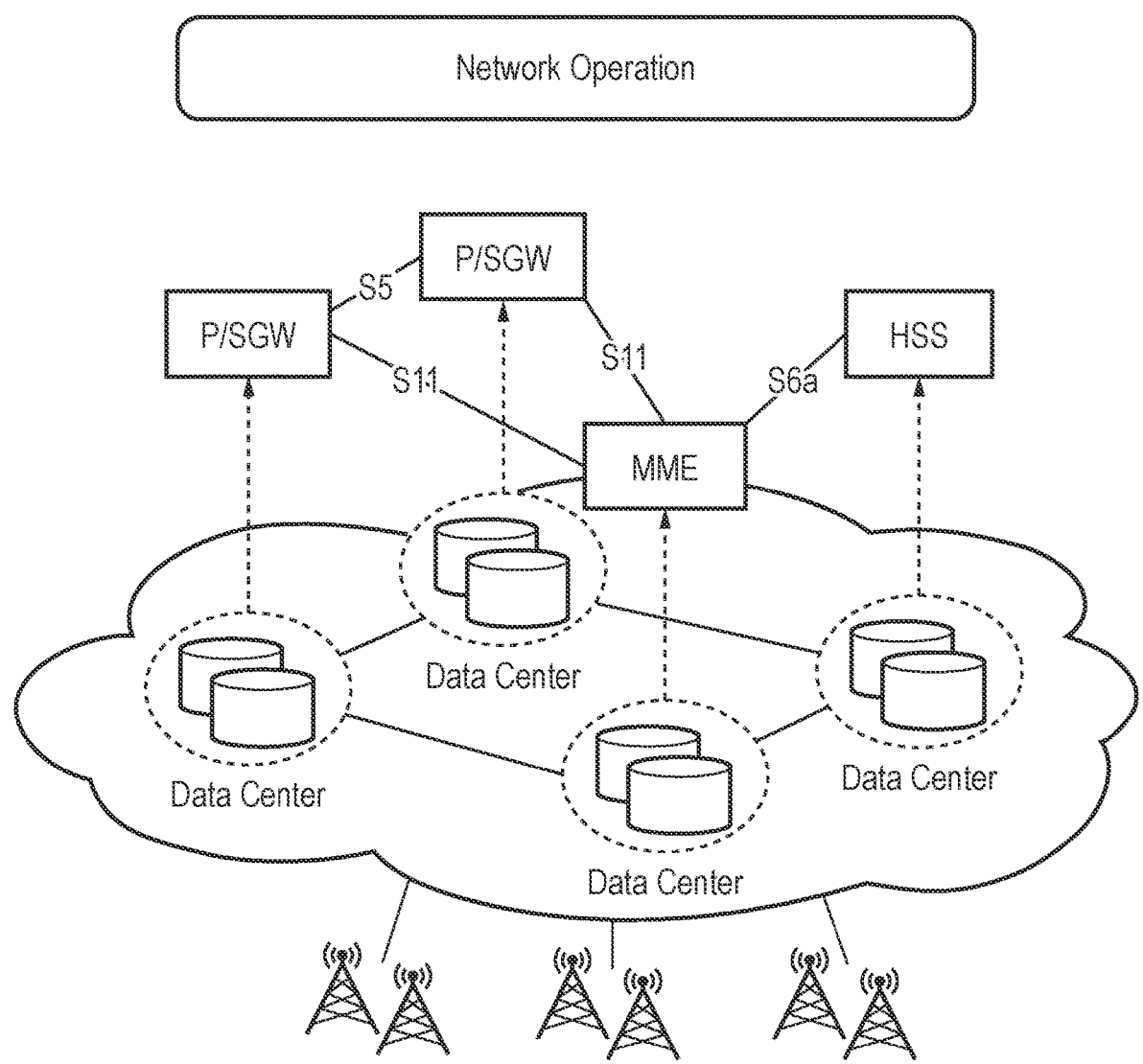
FIG. 5 (already described) is a structural diagram showing the EPC and other network functions virtualised in data centres on the cloud.
Figure 6:
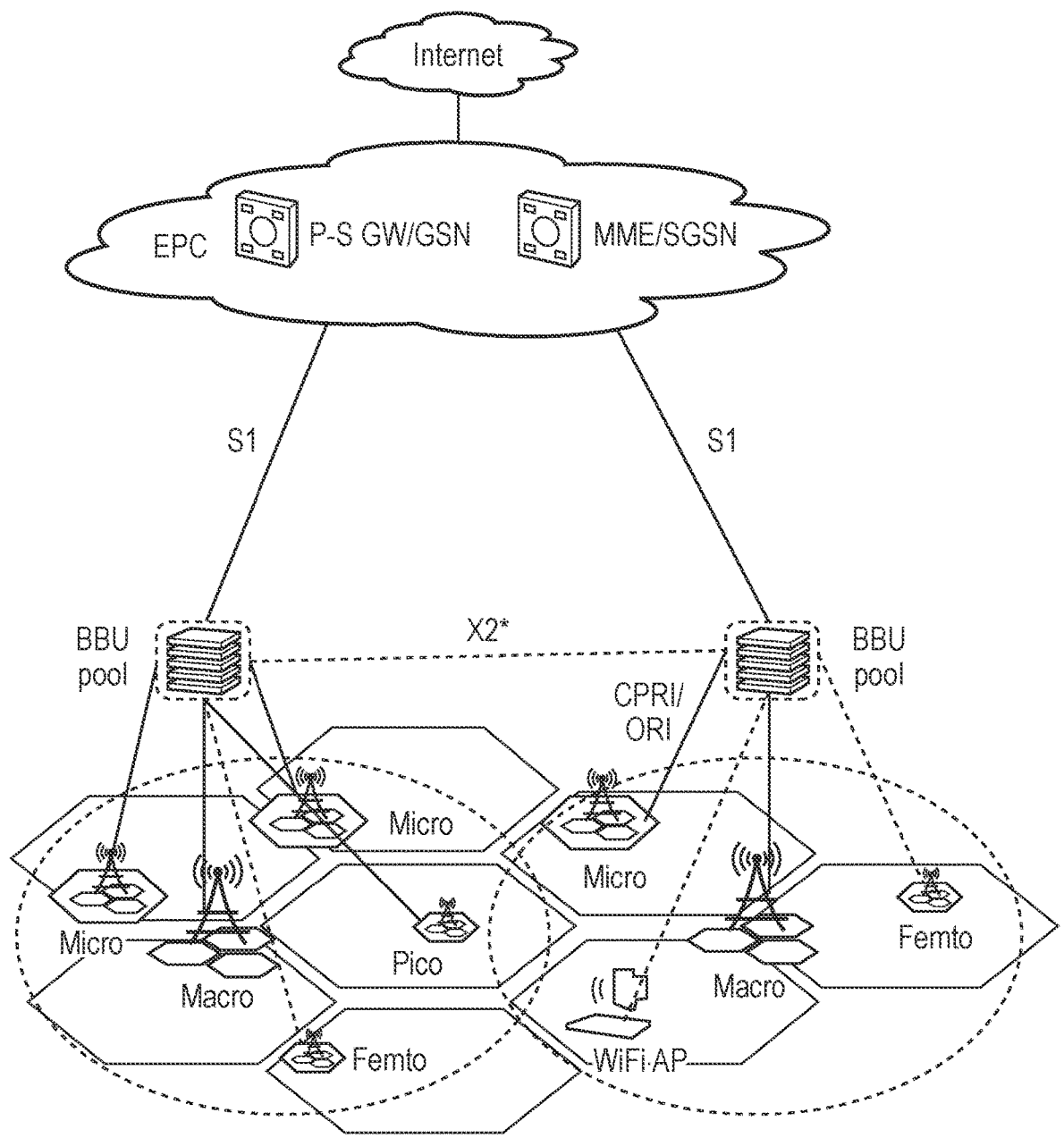
FIG. 6 (already described) is a structural diagram showing virtualisation of the RAN-C-RAN architecture using a centralized BBU pool.

FIG. 1 is a block diagram illustrating an example of equipment suitable for use as a parent base station 200. The equipment includes a TRP and thus includes transmitter/receiver unit(s) 904 connected to at least one antenna 902 (together defining a communication unit) and a controller 906. The controller may be, for example, a microprocessor, DSP, ASIC, FPGA, or other logic circuitry programmed or otherwise configured to perform the various functions described above, in particular the steps in the flowchart of FIG. 9. For example, the various functions of the parent base station described above may be embodied in the form of a computer program stored in the storage medium 908 and executed by the controller 906. The transmission/reception unit 904 is responsible for transmission and reception over the wireless interface to the parent base station under control of the controller 906. In addition, as indicated in the Figure, the controller is connected directly (without intervening equipment) to the data network 300.

Figure 12:
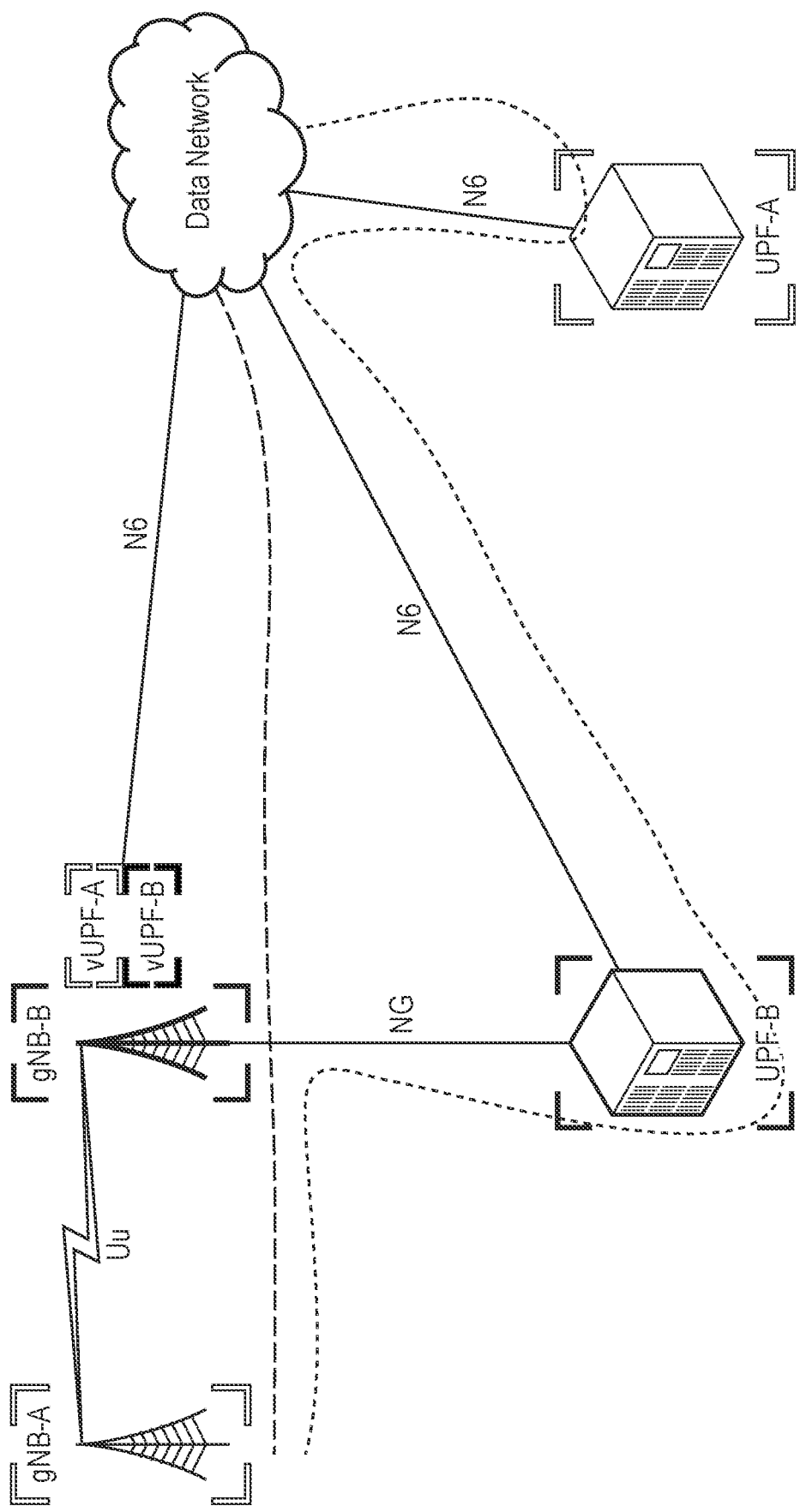
FIG. 12 is a diagram of an optimised wireless backhaul path.

FIG. 12 shows an arrangement in a specific 5G embodiment. The child base station gNB-A, from operator/network A, is shown at the top left of the diagram framed at the corners in a double line. It has no wireline backhaul. The parent base station gNB-B from operator B is shown at the top centre of the diagram, framed at the corners in thick lines. Child base station gNB-A is connected to gNB-B via a Uu interface belonging to operator/network B (i.e. for gNB-B gNB-A is seen as a UE in the B network).

Two paths are possible to access the internet, using the NG (gNB-B to UPF) and N6 (both UPFs to the data network) interfaces shown. The dotted blue path which does not require virtualisation and is not an invention embodiment, is longer than the dashed path (which requires virtualisation). The dotted blue path passes via two network entities, one of which includes the UPF for operator B and the other of which includes the UPF for operator A. The blocks in the diagram represent the "normal" location of the UPFs (i.e. Centralized core network of the operator. In order to use the green path, gNB-B needs to virtualise (take over) some UPF functions. Thus gNB-B, from operator B, has the capability to virtualise some UPF functions from operator A and some UPF functions from operator B (shown as vUPF-A and vUPF-B next to gNB-B).

Figure 13:
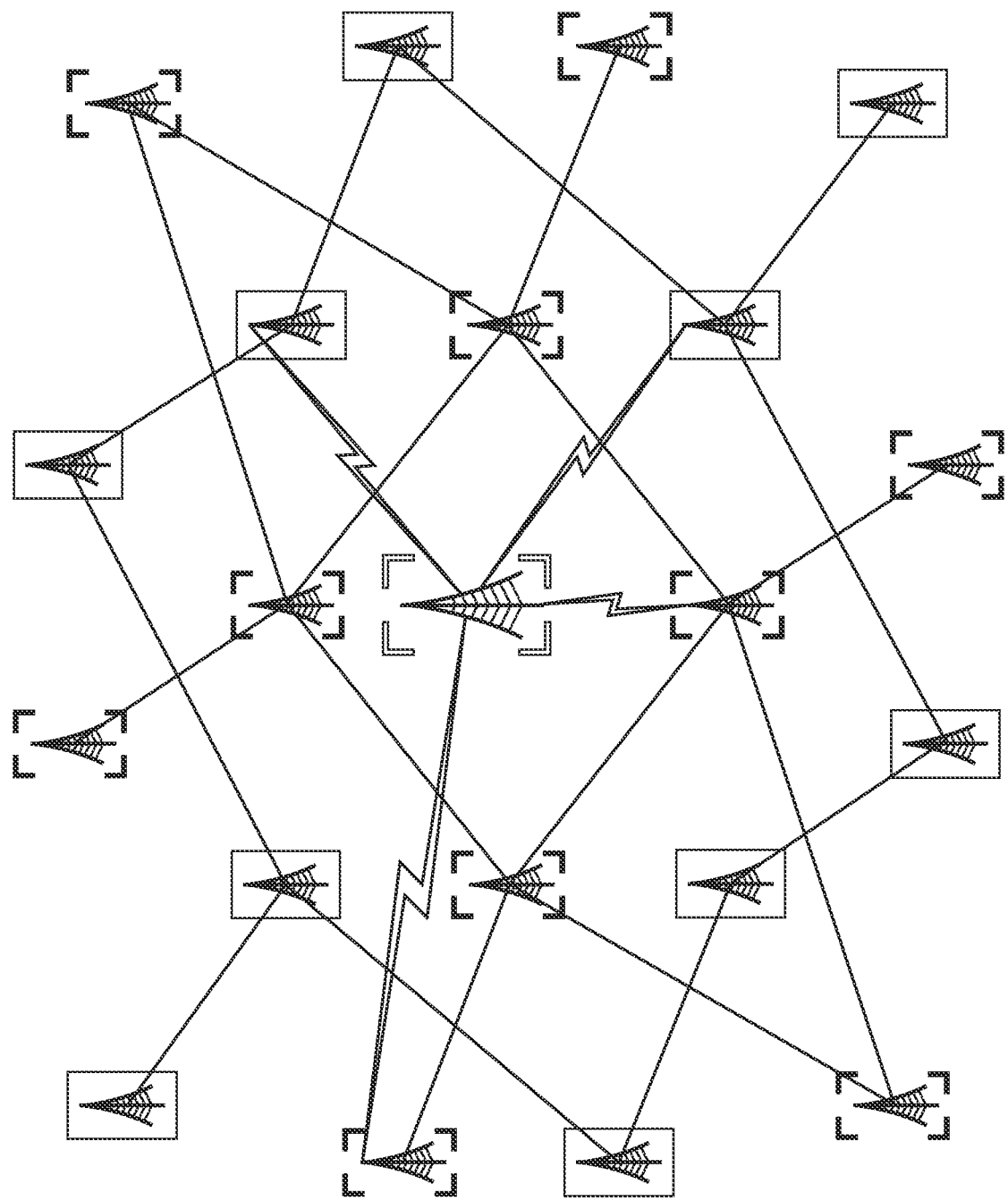
FIG. 13 is a diagram of an overall architecture with wireless backhaul in three networks.

In case of non-optimised "in-band" backhaul sharing, the user plane packets will use the following blue path:
UE to gNB-A via Uu air interface
gNB-A to gNB-B via Uu air interface
gNB-B to UPF-B via NG interface
UPF-B to UPF-A via the Data Network (DN) and N6 interfaces UPF-A to the Data Network via N6 interface In case of an optimised in-band backhaul sharing using the methods described herein, the user plane packets will use the following green path UE to gNB-A via Uu air interface gNB-A to gNB-B via Uu air interface gNB-B to the Data Network (DN) via N6 interface The overall architecture supporting certain embodiments herein is shown in FIG. 13, which is a representation of gNBs in three different networks. The child base station gNB-A, from operator/network A, is shown as before framed at the corners in a double line and centrally. It has no wireline backhaul.

The base stations gNB-B from operator B are shown framed at the corners in thick lines. The base stations gNB-C from operator C are shown in a grey box. Each line between two gNBs in a network represent an Xn link. The child base station has no backhaul access and no wireless access to another base station from the same operator. It is connected via a Uu interface (i.e. acting as a UE) to some of the other base stations, as may be seen by the air interface links in lightning form. This Uu connectivity may change according to the other nodes' capabilities (i.e. CN functions virtualisation and wireline backhaul).

The different processes which will be carried out in certain embodiments are summarised below:

1. The operator B and operator C base stations broadcast over the air that they support the optimised wireless backhaul service.
2. The operator A child base station connects (via Uu interface) to at least one of the base station for each operator which broadcasted the service availability.
3. The child base station subscribes to the optimised wireless backhaul service for at least one of the base station for each of the other operators from which it receives the broadcast service availability (these are the parent base stations).
4. The operator B and operator C parent base stations involved in the UPF functions virtualisation create the needed UPF entities with the help of the participating operators' network (e.g. configuration files). The configuration files are an OAM functionality which depends on UPF vendor and operators, but some examples are: HW (Hardware) configuration, identities, IP addresses, user profiles, security keys, etc. . . .
5. For each of operators B and C, at least one of the base stations connected to the operator A (child) base station sends the list of neighbours' capabilities (for CN virtualisation and backhaul connectivity) to the orange base station. The definition of which base stations are neighbours may be according to the maximum number of hops that capability information is relayed (explained hereinafter), limited to directly adjacent base stations or limited by physical distance, for example. The child base station uses these lists (one per other operator) in order to build a routing table for backhaul connectivity, for example the table may contain all the BS identities (e.g. gNB ID for 5G) of the neighbour BSs which may reach a BS with a virtualised UPF, and where a Uu connection exist. It may contain also some other information on these BSs, such as IP address, operator, weight, etc. . . . A simple example is shown below

| BS ID | Operator ID | IP address |
|---|---|---|
| gNB ID1 | operator 1 | ip@ |
| gNB ID2 | operator 1 | ip@ |
| gNB ID3 | operator 3 | ip@ |

6. The child base station changes the wireless connectivity if needed and update its routing table.
7. The operator B and operator C stations signal their capabilities updates, and forward the updates from neighbour nodes over Xn. They send these updates to the child base station, which modifies its routing table and changes its wireless connections, if necessary.

Pre-Configuration of Network Nodes:

2 types of base station (gNBs in this 5G example) are used:

Parent gNB: A gNB compatible with UPF functions virtualisation (e.g. HW (Hardware), SDN/NFV (Software Defined Networking/Network Function Virtualisation) connected, etc. . . . ) and which may provide an optimised wireless backhaul service.

Child gNB: A gNB with no or limited wireline backhaul connectivity, and which needs wireless backhaul through a neighbour gNB in order to connect to its CN or the Data Network Each parent gNB participating in the optimised wireless backhaul service should be configured (e.g. via OAM) with the following information:

Authorization to offer the optimised wireless backhaul service

CN functions template from other operators (vendor and operator specific]

The list of the neighbour parent gNB from the same operator, created, for example from all the base stations within Max Hops. This may be configured by via a Self-Organised Network function (e.g. SON ANR) or may be configured "by hand" by the operator. The configuration will depend on the operator configuration and deployment but will not necessarily include all the BSs within Max Hops. For example, only certain bands may be included.

"Max Hops" parameter value: The "Max Hops" parameter defines the maximum number of time an optimised wireless backhaul capability information message may be forwarded to a neighbour gNB.

Each child gNB participating in the optimised wireless backhaul service should be configured (e.g. via OAM) with the following information:

Authorization to use the optimised wireless backhaul service, per operator (B or C in FIG. 13)

"Max Uu" parameter value: The "Max Uu" is the number of maximum activated Uu links (i.e. wireless connections between the child gNB and the parent gNBs) used for the optimised wireless backhaul service. The value will depend on operator policy (e.g. contracts with other operators) but also on hardware capabilities. The value may be, for example 2 to 10 (per operator) but other values could also be appropriate depending on the circumstances.

In one embodiment, the following detailed procedure may be used, based on the summary above.

Details of Process 1:

If a parent gNB is authorised to offer the optimised wireless backhaul service (e.g. CN functions virtualisation capability) and if it has available capability (enough HW resources), it will broadcast this information over the air (e.g. via System Information Broadcast).

Details of Process 2:

If a child gNB is authorised to use the optimised wireless backhaul service from a given operator, it will connect to at least one of the gNB of this operator offering the optimised wireless backhaul service. This connection will be a Uu NR connection, for as described in 3GPP TS 38.201: "NR; Physical layer; General description. Legacy procedures will apply.

Details of Process 3:

Once the child gNB is connected to the parent gNB, it sends a service request to the parent gNB network. If the child connects to more than one base station in a network, the first link will be used. If a subsequent link has better quality it may be used once established. The parent gNB network will check the optimised wireless backhaul database stored in the Core Network (e.g. HSS, UDM). See TS 23.501 chapter 6 for details. The parent gNB network will authorize the child gNB to access the service, or not as the case may be. The parent gNB is then informed of the decision and will update its own service database. If needed the bearers and/or QoS flows are modified to match the QoS required for the service.

Details of Process 4:

The parent gNB creates an instance of the CN functions needed, according to the templates received during the configuration phase, and then informs the child gNB that the Uu connection between the nodes may be used as an optimised wireless backhaul link. At this stage the child gNB may start use of the wireless backhaul link to the parent gNB and the direct link from the parent gNB to the data network to form a 2-link backhaul path.

Details of Process 5:

The parent gNB sends the list of the neighbour parent gNBs of the same operator, including their CN functions virtualisation and wireline backhaul capabilities, to the child gNB. The child gNB will then update its backhaul routing table.

The neighbour base stations may be limited to Max Hops, for example between 2 and 10. Alternatively, the limitation may be according to a paging area (which may be different for each operator).

Details of Process 6:

At this stage a child gNB is in the following state:
Connected to at least one parent gNB via Uu interface
Registered as a child gNB in the parent gNB operator's optimised wireless backhaul database
Has an up-to-date database of the neighbour gNB optimised wireless backhaul capabilities
Has a routing table used to send user plane packets via the shared wireless backhaul At this stage two different kind of events may change the way the child gNB routes its user plane packets:

6.1: The radio condition of the Uu link(s) changes
6.2: The optimised wireless backhaul capabilities of the neighbour gNBs changes, for example, if more spectrum is needed for other purposes or if there are different types of underlying networks used for different backhauls, e.g. different types of fibre.

Figure 14:
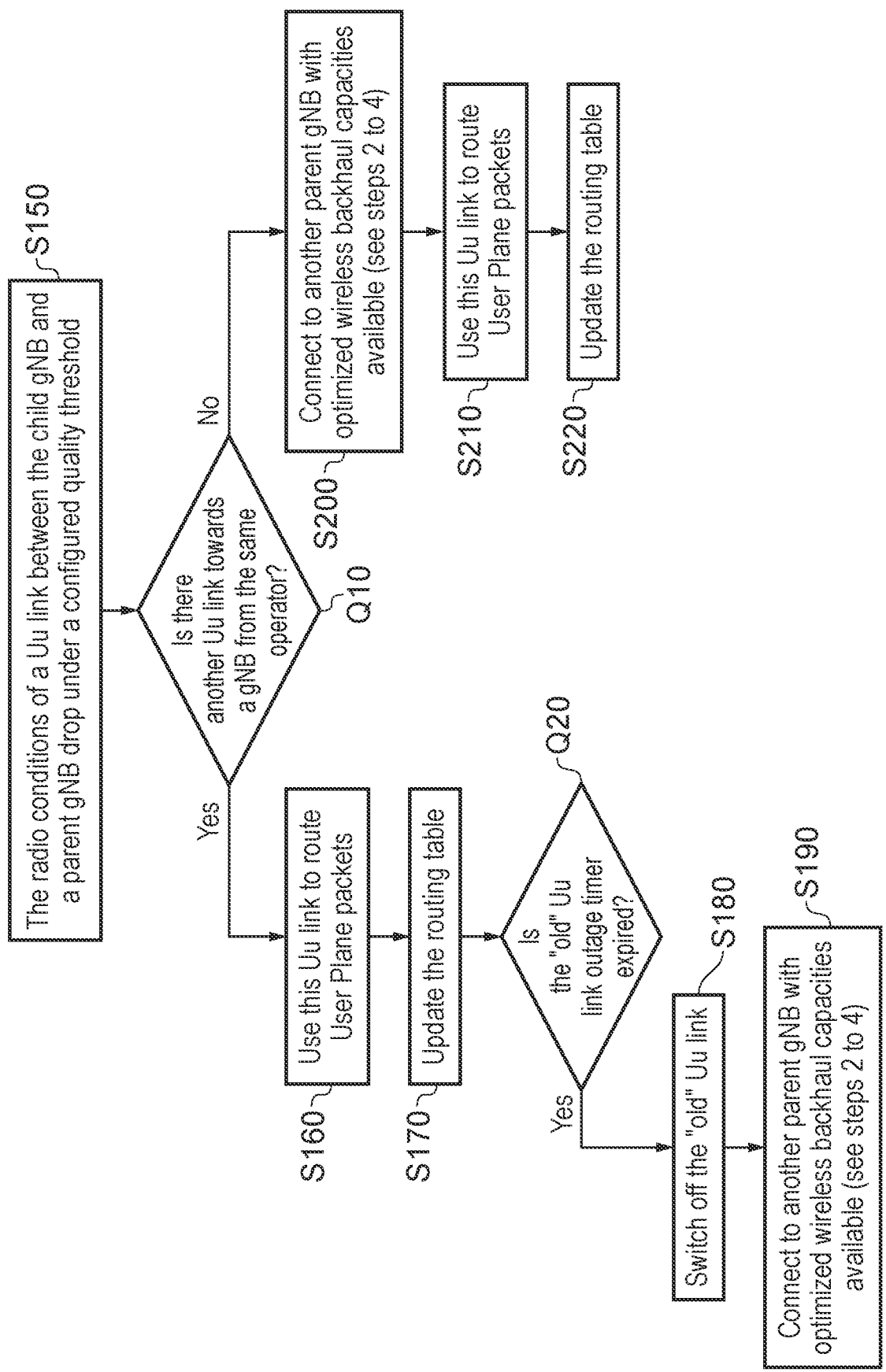
FIG. 14 is a flowchart of the behaviour of a child base station in case of Uu link outage.

Details of 6.1:

The detailed behaviour of the child gNB in case of radio link outage in one embodiment is described in FIG. 14.

In step S150, the radio conditions of a Uu link between the child gNB and a parent gNB drop under a threshold. For example, the change may be due to: humidity increases, or an obstacle, between the 2 gNBs. The threshold may be −6 dB. Q10 asks whether there is another Uu link between the child and a base station of the same operator. In S160 if there is another Uu link between the child and a base station of the same operator then this Uu link is used to route user plane packets, and the routing table is updated in S170. Q20 asks whether the old Uu link outage timer has expired, and if so the old Uu link is switched off in S180. In step S190, a connection to another optimised parent gNB in the same network is made to make sure that enough links are available within the network belonging to the operator.

On the other hand if there is no Uu link between the child and a base station of the same operator in Q10, then in step S190, a connection to another optimised parent gNB in the same network is made. In S210, this Uu link is used to route user plane packets and in S220 the routing table is updated.

The child base station will change to another operator/network providing wireless backhaul depending on the circumstances. If there is no other link to a base station of the current operator, the change must be made. However, a changeover in other circumstances may be configurable, for example according to one or more parameters such as link quality, cost etc. . . .

Figure 15:
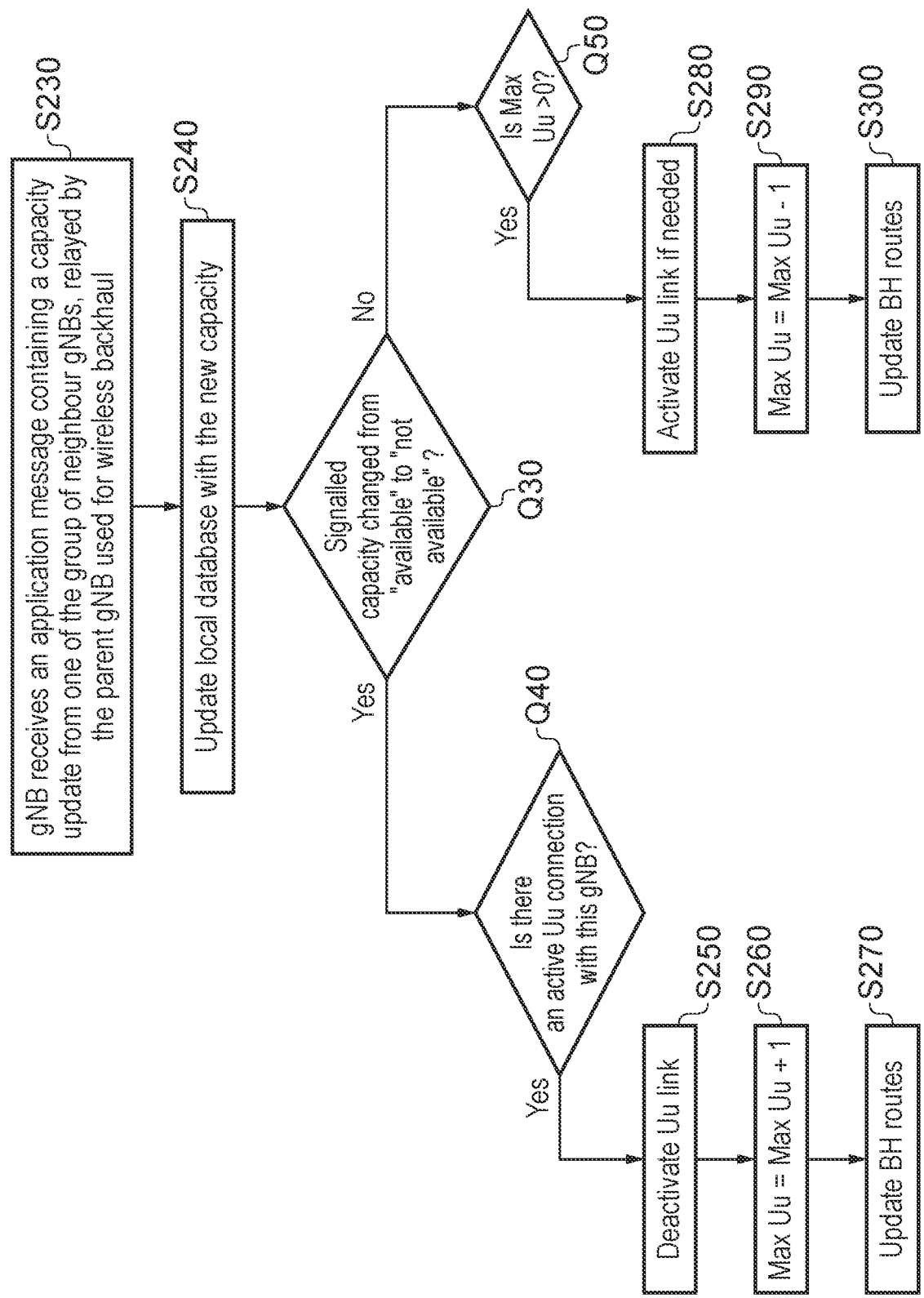
FIG. 15 is a flowchart of the behaviour of a child base station when it receives a wireless backhaul capability update from a parent base station.

Details of Step 6.2:

The detailed behaviour of the child gNB in case of a capability update in one embodiment is described in FIG. 15.

In step S230, a gNB receives a capability update message from one of the group of neighbouring gNBs, relayed by the parent gNB used for wireless backhaul. In S240, the gNB updates its local database. Q30 asks whether the capability has changed from "available" to "not available". If so, Q40 asks whether there is an active Uu connection with this gNB. If so, it is deactivated in S250, the maximum number of additional Uu links is increased by one in S260 and the backhaul routing table is updated in S270.

On the other hand, if the capability has not changed from "available" to "not available" (i.e. it has changed in the other direction to available), Q50 asks whether the maximum number of additional Uu links is greater than zero. If so, the link to the gNB with the capability update is activated if required in S280, and then the maximum number of additional Uu links is decreased by one in S290 and the backhaul routing table is updated in S300.

Figure 16:
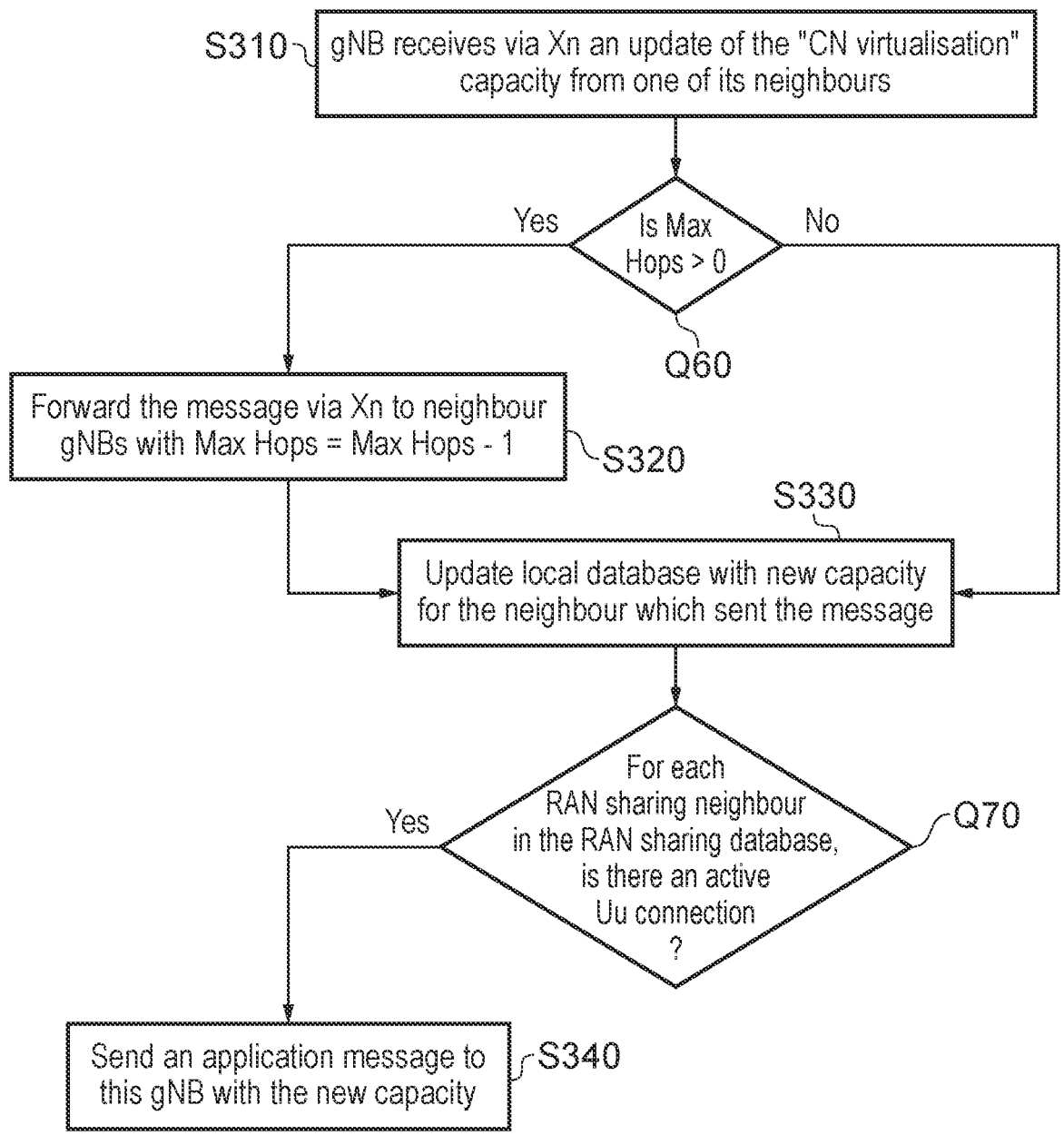
FIG. 16 is a flowchart of base station behaviour when receiving an optimised wireless capability update.

Details of Step 7:

In case of changes in the optimised wireless backhaul capabilities, a parent gNB will signal the new capabilities to its neighbour gNBs, together with the "Max Hops" parameter configured during pre-configuration step. The behaviour of the gNB receiving this update is detailed in FIG. 16.

In step S310, a gNB receives a capability update for a neighbour gNB from one of its adjacent neighbours. Q60 asks whether Max hops (the number of hops left to relay the message) is greater than zero, and if so the gNB decrements Max Hops and forwards the update to its adjacent gNBs in S320. Then the gNB updates its local database with the new capability for the neighbour that originally sent the message in S330. If Max Hops is zero, then the message is not forwarded but the update is still carried out in S330.

Q70 asks whether there is an active Uu connection for each RAN sharing neighbour in the RAN sharing database. The RAN sharing database of a given gNB contains the neighbour gNB participating in the RAN sharing service, with or without wired backhaul and/or virtualisation capacity. In S340, for each of these gNB, an application message is sent with the new capability.

Figure 17:
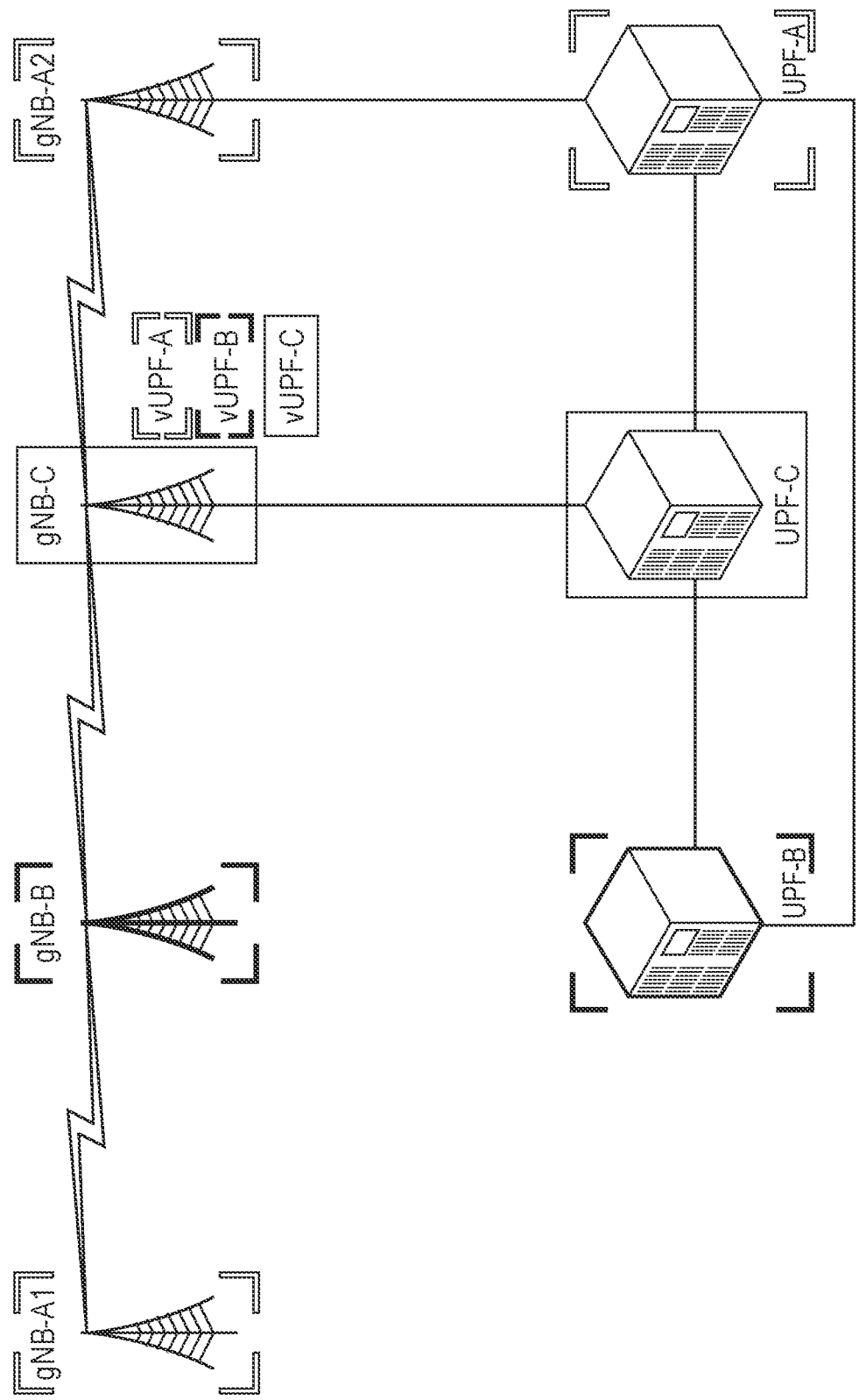
FIG. 17 is a diagram of wireless backhaul paths, one wireless path using an intermediate base station and one direct wireless path.

FIG. 17 shows an arrangement in a specific 5G embodiment to demonstrate the use of intermediate base stations in an embodiment.

The child base stations here are from operator/network A and are marked as gNB-A1 and gNB-A2. They are shown at the top left and right of the diagram framed at the corners in a double line. They have no wireline backhaul. The parent base station gNB-C from operator C (in a grey box) is shown at the top of the diagram. It has a direct wireless link to the right hand gNB-A2. It also has an indirect wireless backhaul link via intermediate base station gNB-B from operator B (framed at the corners in thick lines) to the left hand gNB-A1. Hence the parent base station gNB-C needs to virtualise its own UPF, as well as the UPF from operator/network A and B.

Figure 18:
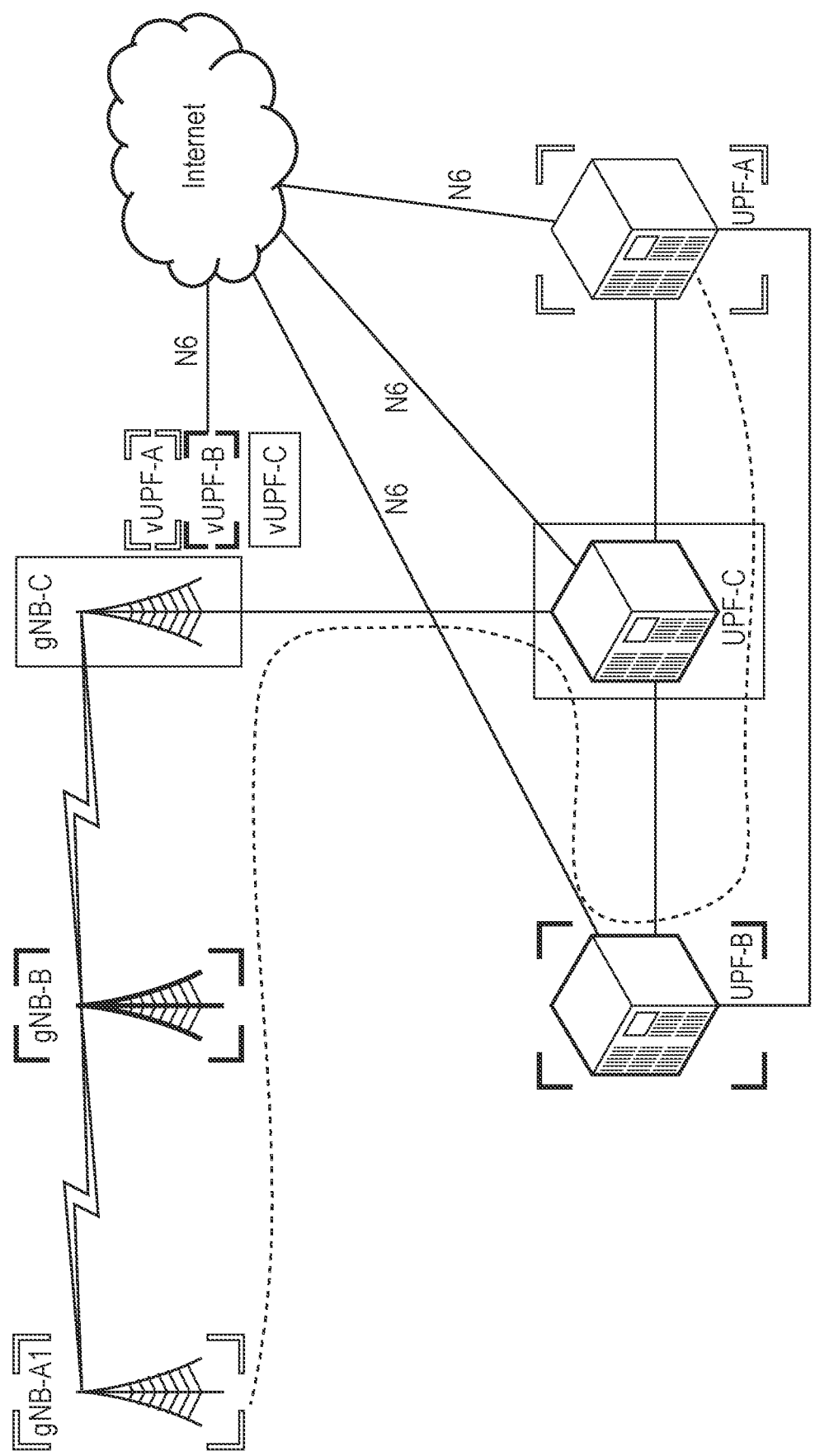
FIG. 18 is a diagram of a relayed wireless backhaul path arrangement using an intermediate base station.

FIG. 18 shows in dashed lines the non-optimised backhaul path including the intermediate base station shown in FIG. 17. Again the parent base station gNB-C virtualises its own UPF, as well as the UPF from operator/network A and B. This allows the optimised path, shown as two wireless links from gNB-A1 to gNB-B and from gNB-B to gNB-C and a wired N6 link from gNB-C to the internet. Here, gNB-B acts as a wireless relay station receiving the backhaul from gNB-A1 over its own air interface and sending the backhaul on to gNB-C over gNB-C's air interface. The UPF virtualisation is required for every operator network that the backhaul passes through.

Certain embodiments herein may allow methods to:
Subscribe to an optimised wireless backhaul sharing
Broadcast over the air an "optimised wireless backhaul service" information
Wirelessly transfer CN functions virtualisation and wireline backhaul capabilities to neighbour (child) base stations which subscribe to an optimised wireless backhaul service
Transfer CN functions virtualisation and wireline backhaul capabilities to neighbour nodes participating in the optimised wireless backhaul service
Configure and use the maximum number of hops for the Xn signalling (information about virtualisation resources)
Configure and use the maximum number of Uu links used with neighbours gNB in order to share wireless backhaul
Configure and use the Uu link outage timer.

Glossary

Optimised wireless backhaul service: a wireless backhaul service offered by a base station (or gNB) from a given operator to a base station (or gNB) from another operator. In embodiments, this includes the ability to virtualise some CN functions from one or most usually both of these operators.

CN functions virtualisation capability: The capability for a given gNB to virtualise (host) some CN functions from its own network/different operators as required for the optimised wireless backhaul service. This capability may change in time (e.g. lack of HW resources, new policies, etc. . . . ). This capability may be defined by a limited number of values, representing a relative capability. For example 4 values (i.e. 2 bits signalling) could be:
No capability
Limited capability (e.g. may change quickly to no capability)
Good capability (e.g. enough resources but not 100%)
Full capability (e.g. 100% of the resources)

Wireline backhaul capability: The capability for a given gNB to be connected to a data network via a wireline connection. This capability is binary (i.e. available or not available) and may be represented by a single bit.

In-band backhaul: Using the wireless service spectrum in order to provide a wireless backhaul link. It means that the wireless backhaul link uses the same spectrum (e.g. 200 MHz in the 24.25-27.5 GHz band) as the wireless service (i.e. 5G)

INDUSTRIAL APPLICABILITY

The fields of application of this invention includes all wireless communications systems where wireless backhaul may be employed.

STATEMENTS

Embodiments of the invention extend to the following statements:

Statement 1. A method of securing wireless backhaul for a child base station in a first network provided by a first operator, wherein:
any parent base station with wireline backhaul capability and configured to virtualise a core network User Plane Function, UPF, advertises that it supports a wireless backhaul service;
the child base station in the first network connects over an air interface to one or more parent base stations in a second network provided by a second operator;
the child base station sends a backhaul service request to a connected parent base station;
when the backhaul service request is accepted, the connected parent base station uses a virtualised UPF to enable a direct wireline backhaul link between the parent base station and a data network; and
the child base station uses the air interface as a wireless backhaul link and the wireline backhaul link of the connected parent base station for backhaul.

Statement 2. A method according to statement 1, wherein:
the air interface uses resources allocated to the connected parent base station for Radio Access Network, RAN, communication with User Equipments, UEs.

Statement 3. A method according to statement 1 or 2, wherein:
the connected parent base station virtualises core network UPFs of the first network and of the second network to provide the wireless backhaul service.

Statement 4. A method according to any of the preceding statements, wherein:
an intermediate base station acts as a wireless backhaul relay between the child base station and the parent base station.

Statement 5. A method according to any of the preceding statements, wherein:
the child base station connects to more than one parent base station in the second network and selects one for backhaul use; and wherein:
when the radio conditions between the child base station and the connected parent base station being used for backhaul drop below a quality threshold, the child base station uses a different connected parent base station in the second network for backhaul.

Statement 6. A method according to any of the preceding statements, wherein:
the connected parent base station being used for backhaul sends to the child base station a list of the wireless backhaul service capabilities of neighbouring base stations in the second network and the child base station builds a routing table from the list for backhaul connectivity.

Statement 7. A method according to statement 6, wherein:
the neighbouring base stations are defined by a physical distance from the parent base station or by a distance in terms of a number of links between base stations from the parent base station.

Statement 8. A method according to any of the preceding statements, wherein:
any base station sends a wireless backhaul capability message to adjacent base stations of the same network via an interface between base stations, the message including a maximum hops count limiting the number of times that the wireless backhaul capability message is relayed along links between base stations.

Statement 9. A method according to statement 8, wherein:
when a base station receives a wireless backhaul capability message with a maximum hops count above zero, the receiving base station decrements the maximum hops count and relays the wireless backhaul capability message to adjacent base stations.

Statement 10. A method according to statement 8 or 9, wherein:
when a base station receives the wireless backhaul capability message, it passes the wireless backhaul capability message to any child base station to which it is connected.

Statement 11. A method according to any of the preceding statements, wherein:
the child base station connects over a third network air interface to one or more parent base stations in a third network provided by a third operator.

Statement 12. A method according to statement 11, wherein:
when the radio conditions between the child base station and the connected parent base station being used for backhaul drop below a quality threshold, and when there is no other connected parent base station in the second network, the child base station connects to another parent base station in the second network or in the third network.

Statement 13. A method according to any of the preceding statements, wherein:
the child base station has a maximum number (Max Uu) of additional air interface links to connected parent base stations and wherein when one connected parent base station changes its wireless backhaul capability from available to unavailable, the child base station deactivates its air interface link to that parent base station and increases the maximum number by one.

Statement 14. A method according to any of the preceding statements, wherein:
the child base station has a maximum Uu number (Max Uu) of additional air interface links to connected parent base stations and wherein when one parent base station changes its wireless backhaul capability from unavailable to available, the child base station activates its air interface link to that parent base station when the maximum Uu number is greater than zero and decreases the maximum additional air interfaces Uu number by one.

Statement 15. A child base station in a first network provided by a first operator, the child base station comprising:

a controller and a transmission and reception unit, the controller to control the transmission and reception unit to:
connect over an air interface to one or more parent base stations in a second network provided by a second operator, the one or more parent base stations having wireline backhaul capability and configured to virtualise a core network User Plane Function, UPF to allow a direct wireline backhaul link to a data network;
to send a backhaul service request to a connected parent base station; and
when the backhaul service request is accepted, to use the air interface as a wireless backhaul link to the wireline backhaul link of the connected parent base station.

Statement 16. A parent base station with wireline backhaul capability and configured to virtualise a core network User Plane Function, UPF, the parent base station being in a second network provided by a second operator and comprising:
a controller, a transmission and reception unit and a connection to a data network;
wherein:
the controller controls the transmission and reception unit to:
advertise that the parent base station supports a wireless backhaul service;
allow connection over an air interface of a child base station, the child base station being in a first network provided by a first operator; and to
receive and accept a backhaul service request from the connected child base station; and
the controller virtualises a UPF to enable a direct wireline backhaul link between the parent base station and a data network, enabling the child base station to use the air interface as a wireless backhaul link and the wireline backhaul link of the connected parent base station for backhaul.

Statement 17. A method in a child base station in a first network provided by a first operator, wherein the child base station:
connects over an air interface to one or more parent base stations in a second network provided by a second operator, the one or more parent base stations having wireline backhaul capability and configured to virtualise a core network User Plane Function, UPF to allow a direct wireline backhaul link to a data network;
sends a backhaul service request to a connected parent base station; and
when the backhaul service request is accepted, uses the air interface as a wireless backhaul link to the direct wireline backhaul link of the connected parent base station.

Statement 18. A method in a parent base station with wireline backhaul capability and configured to virtualise a core network User Plane Function, UPF, the parent base station being in a second network provided by a second operator and the method comprising:
advertising that the parent base station supports a wireless backhaul service;
allowing connection over an air interface of a child base station, the child base station being in a first network provided by a first operator;
receiving and accepting a backhaul service request from the connected child base station; and
virtualising a UPF to enable a direct wireline backhaul link between the parent base station and a data network, enabling the child base station to use the air interface as a wireless backhaul link and the wireline backhaul link of the connected parent base station for backhaul.

Statement 19. Software in the form of computer-readable instructions which, when executed by a controller in a base station, causes the base station to function as the child or parent base station referred to in any of the preceding statements.

The invention claimed is:

1. A method of wireless backhaul for a child base station in a first network provided by a first operator, wherein:
   a parent base station with backhaul capability is configured to advertise that the parent base station supports a wireless backhaul service;
   the child base station in the first network connects over an air interface to one or more parent base stations in a second network, the one or more parent base stations each being configured to advertise that the parent base station supports a wireless backhaul service;
   the child base station sends a backhaul service request to a connected parent base station;
   when the backhaul service request is accepted, the connected parent base station controls a transmission and reception unit of the connected parent base station to provide the child base station with a wireless backhaul link through the air interface to a core network of the first operator; and
   the child base station uses the air interface as a wireless backhaul link to a core network of the first operator.

2. The method according to claim 1, wherein: the air interface uses resources allocated to the connected parent base station for Radio Access Network, RAN, communication with User Equipments, UEs.

3. The method according to claim 1, wherein: an intermediate base station acts as a wireless backhaul relay between the child base station and the parent base station.

4. The method according to claim 1, wherein:
   the child base station connects to more than one parent base station in the second network and selects one for backhaul use; and wherein:
   when the radio conditions between the child base station and the connected parent base station being used for backhaul drop below a quality threshold, the child base station uses a different connected parent base station in the second network for backhaul.

5. The method according to claim 1, wherein:
   the connected parent base station being used for backhaul sends to the child base station a list of the backhaul service capabilities of neighbouring base stations in the second network and the child base station builds a routing table from the list for backhaul connectivity.

6. The method according to claim 5, wherein: the neighbouring base stations are defined by a physical distance from the parent base station or by a distance in terms of a number of links between base stations from the parent base station.

7. The method according to claim 1, wherein: any base station sends a wireless backhaul capability message to adjacent base stations of the same network via an interface between base stations, the message including a maximum hops count limiting the number of times that the wireless backhaul capability message is relayed along links between base stations.

8. The method according to claim 7, wherein: when a base station receives a wireless backhaul capability message with a maximum hops count above zero, the receiving base station decrements the maximum hops count and relays the wireless backhaul capability message to adjacent base stations.

9. The method according to claim 7, wherein: when a base station receives the wireless backhaul capability message, it passes the wireless backhaul capability message to any child base station to which it is connected.

10. The method according to claim 1, wherein: the child base station connects over a third network air interface to one or more parent base stations in a third network provided by a third operator.

11. The method according to claim 10, wherein: when the radio conditions between the child base station and the connected parent base station being used for backhaul drop below a quality threshold, and when there is no other connected parent base station in the second network, the child base station connects to another parent base station in the second network or in the third network.

12. A child base station in a first network provided by a first operator, the child base station comprising:
    a controller and a transmission and reception unit, the controller to control the transmission and reception unit to:
    connect over an air interface to one or more parent base stations in a second network, the one or more parent base stations having backhaul capability and configured to advertise that the parent base station supports a wireless backhaul service;
    to send a backhaul service request to a connected parent base station; and
    when the backhaul service request is accepted, to use the air interface as a wireless backhaul link to a core network of the first operator.

13. A parent base station with backhaul capability, the parent base station being in a second network and comprising:
    a controller, a transmission and reception unit and a connection to a data network; wherein:
    the controller controls the transmission and reception unit to:
    advertise that the parent base station supports a wireless backhaul service;
    allow connection over an air interface of a child base station, the child base station being in a first network provided by a first operator; and to
    receive a backhaul service request from the connected child base station; and
    the controller further controls the transmission and reception unit to provide the child base station with a wireless backhaul link to a core network of the first operator through the air interface when the backhaul service request is accepted.

14. A method in a child base station in a first network provided by a first operator, wherein the child base station:
    connects over an air interface to one or more parent base stations in a second network, the one or more parent base stations having backhaul capability and configured to advertise that the parent base station supports a wireless backhaul service;
    sends a backhaul service request to a connected parent base station; and
    when the backhaul service request is accepted, uses the air interface as a wireless backhaul link to a core network of the first operator.

15. A method in a parent base station with backhaul capability, the parent base station being in a second network and the method comprising:
    advertising that the parent base station supports a wireless backhaul service;

allowing connection over an air interface of a child base station, the child base station being in a first network provided by a first operator;

receiving a backhaul service request from the connected child base station; and controlling the transmission and reception unit to provide the child base station with a wireless backhaul link to a core network of the first operator through the air interface when the backhaul service request is accepted.

* * * * *